United States Patent
Smith et al.

(10) Patent No.: US 11,738,452 B1
(45) Date of Patent: Aug. 29, 2023

(54) SOLE WITH VARIOUS COMPLIANT REGIONS FOR ROBOTS

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

(21) Appl. No.: 17/877,794

(22) Filed: Jul. 29, 2022

(51) Int. Cl.
*B25J 19/02* (2006.01)
*B25J 9/16* (2006.01)
*B25J 9/00* (2006.01)
*B25J 19/00* (2006.01)
*B62D 57/032* (2006.01)

(52) U.S. Cl.
CPC ............. *B25J 9/162* (2013.01); *B25J 9/0006* (2013.01); *B25J 19/0008* (2013.01); *B25J 19/02* (2013.01); *B62D 57/032* (2013.01)

(58) Field of Classification Search
CPC ...... B25J 9/132; B25J 9/0006; B25J 19/0008; B25J 19/02; B62D 57/032
See application file for complete search history.

(56) References Cited

U.S. PATENT DOCUMENTS

| | | | |
|---|---|---|---|
| 6,920,374 B2* | 7/2005 | Takenaka | B62D 57/02 700/261 |
| 7,099,747 B2* | 8/2006 | Mikami | B62D 57/032 180/8.1 |
| 7,120,518 B2* | 10/2006 | Takenaka | B62D 57/032 901/33 |
| 7,308,335 B2* | 12/2007 | Takenaka | B62D 57/02 901/1 |
| 7,308,336 B2* | 12/2007 | Takenaka | B62D 57/02 901/1 |

(Continued)

FOREIGN PATENT DOCUMENTS

| | | |
|---|---|---|
| CN | 101823517 A | 9/2010 |
| CN | 103802907 A | 5/2014 |

(Continued)

OTHER PUBLICATIONS

David et al., Study of an external passive shock-absorbing mechanism for walking robots, 2008, IEEE, p. 435-400 (Year: 2008).*

(Continued)

*Primary Examiner* — McDieunel Marc

(57) ABSTRACT

A robot system, comprising a robot capable of gait or gait-like operations, stance or stance-like operations, or a combination of these. The robot can comprise at least one ground-contacting appendage configured to facilitate locomotion of the robot. The system can further comprise a sole supported on the ground-contacting appendage that is operable to interface with a ground surface. The sole can comprise a robot interface facilitating attachment of the sole to the robot, a first sole component having a ground-contacting surface, the first sole component defining a first compliant zone, and a second sole component having a ground-contacting surface, the second sole component defining a second compliant zone. The first sole component can comprise a compliance the same or different than the second sole component.

53 Claims, 21 Drawing Sheets

(56) References Cited

U.S. PATENT DOCUMENTS

| | | | | |
|---|---|---|---|---|
| 7,319,917 B2* | 1/2008 | Takenaka | ............. | B62D 57/032 |
| | | | | 901/1 |
| 7,319,918 B2* | 1/2008 | Takenaka | ............. | B62D 57/032 |
| | | | | 901/1 |
| 7,319,919 B2* | 1/2008 | Takenaka | ............... | B25J 13/085 |
| | | | | 901/1 |
| 7,337,040 B2* | 2/2008 | Takenaka | ............... | B62D 57/02 |
| | | | | 901/1 |
| 7,379,789 B2* | 5/2008 | Takenaka | ............. | B62D 57/032 |
| | | | | 901/1 |
| 8,204,626 B2* | 6/2012 | Yoshiike | ............. | B62D 57/032 |
| | | | | 600/509 |
| 9,526,636 B2* | 12/2016 | Bédard | ..................... | A61F 2/60 |
| 9,926,025 B1 | 3/2018 | Blankespoor et al. | | |
| 10,300,969 B1 | 5/2019 | Blackespoor et al. | | |

FOREIGN PATENT DOCUMENTS

| | | |
|---|---|---|
| CN | 205250544 U | 5/2016 |
| CN | 111267992 A | 6/2020 |

OTHER PUBLICATIONS

Kaslin et al., Towards a Passive Adaptive Planar Foot with Ground Orientation and Contact Force Sensing for Legged Robots, 2019, IEEE, p. (Year: 2019).*

Lui et al., Concept and design of a lightweight biped robot for walking on rough terrain, 2017, IEEE, p. 1-6 (Year: 2017).*

Lui et al., Cat-inspired mechanical design of self-adaptive toes for a legged robot, 2016, IEEE, p. 2425-2430 (Year: 2016).*

\* cited by examiner

1200 ⇢

1202: Configuring a sole to comprise a first sole component having a ground-contacting surface to be supported on an appendage of the gait-capable robot at a first zone, the first sole component being configured to facilitate a stable sole-strike event during locomotion of the gait-capable robot.

1204: Configuring the sole to comprise a second sole component having a ground-contacting surface to be supported on the appendage of the gait-capable robot at a second zone, the second sole component being configured to facilitate a stable flat-footed stance of the gait-capable robot.

1206: Configuring the sole to comprise a third sole component having a ground-contacting surface to be supported on the appendage of the gait-capable robot at a third zone, the third sole component being configured to facilitate a stable sole-off event during locomotion of the gait-capable robot.

1208: Configuring the sole to comprise a fourth sole component having a ground-contacting surface, to be supported on the appendage of the gait-capable robot at a fourth zone, the fourth sole component being configured to support a lateral area of the ground-contacting appendage of the gait-capable robot.

1210: Configuring the sole to comprise a fifth sole component having a ground-contacting surface, to be supported on the appendage of the gait-capable robot at a fourth zone, the fifth sole component being configured to support a medial area of the ground-contacting appendage of the gait-capable robot.

*FIG. 12*

SOLE WITH VARIOUS COMPLIANT REGIONS FOR ROBOTS

BACKGROUND

In gait-capable, and/or other stance and/or motion-capable, robots and robotic systems (e.g., humanoid robots, wearable robotic exoskeletons, robots equipped with two or more legs, and others), the lowermost ground contacting and interfacing portion (i.e., an appendage, the feet, etc.) of the gait-capable robot or robotic system impacting a surface during walking or other gait-based locomotion results in external impulses and forces acting on the robot or robotic system. External impacts and impulses on a robot or robotic system can lead to wear and tear, physical instability, control signal instability, and unpredictable oscillations within the system that can negatively affect the performance, predictability, and control of the robot or robotic system. Rigid surfaces and materials typically used for the lowermost ground contacting and interfacing portion of the robot or robotic system do not generally absorb impacts sufficiently and can lead to high impulses and forces acting on the structures, sensors, and systems of a gait-capable robot or robotic system. Stated differently, monolithic rigid surfaces used for the lowermost ground contacting and interfacing portion of the robot or robotic system do not adequately absorb impact and do not allow this portion to conform to the surface or ground upon which the robot or robotic system is traversing, thereby leading to high forces and impulses acting on the robot or robotic system. Furthermore, robots that are not gait-capable, but can still perform movement in one or more stances on a surface that interfaces with a sole of the robot can also be subject to instability. For example, a robot that can achieve an upright (e.g. standing) stance and/or a lowered (e.g. squatting) stance can experience instability on a supporting surface and impacts between the robot and the supporting surface when performing movement and/or functions in either of the upright or lowered stances. Additionally, the movement-capable robot can experience instability and impacts when moving between different stances. In order to lessen instability and other effects of impacts on a robot, new configurations for interfacing a robot with objects and surfaces continue to be developed.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 12 illustrates a method of configuring a sole in accordance with an example of the present disclosure.

Figure 1A:
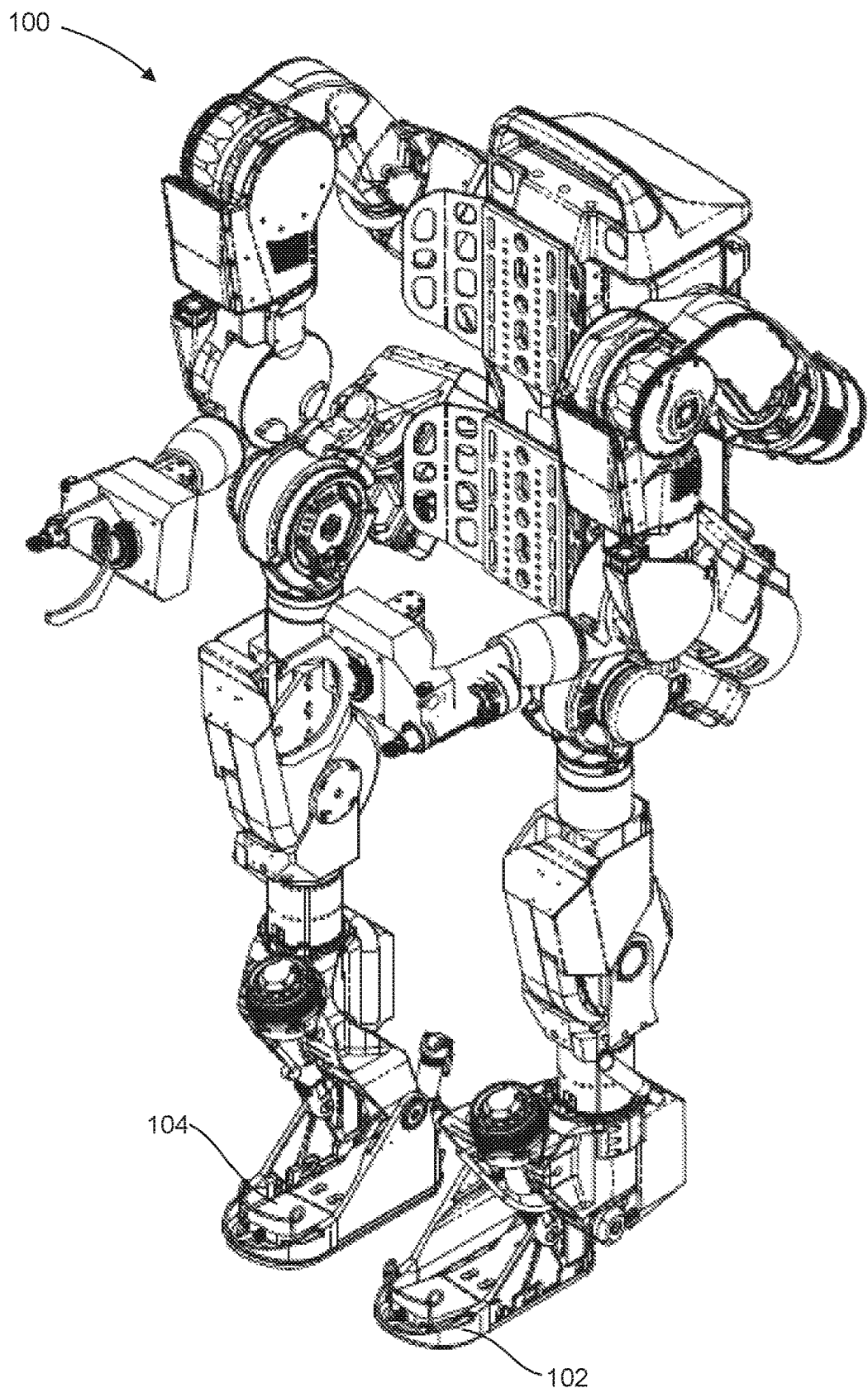
FIG. 1A illustrates an isometric view of a in the form of a wearable exoskeleton in accordance with an example of the present disclosure, which robot can be gait-capable, or capable of one or more stance-associated operations, or any combination of these.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

Disclosed herein is a sole for a robot that is capable of one or more gait operations (gait-capable), or that is capable of one or more stance-associated operations. The sole can comprise a first sole component having a ground-contacting surface. The first sole component can define a first compliant zone of the sole. The sole can further comprise a second sole component having a ground-contacting surface. The second sole component can define a second compliant zone. The first sole component can have a compliance that is different than a compliance of the second sole component. The sole can further comprise a robot interface operable to facilitate attachment of the sole to the robot.

Also disclosed herein is a robot system. The robot system can comprise a robot comprising at least one ground-contacting appendage configured to facilitate locomotion of the robot. The robot system can further comprise a sole supported on the appendage, and operable to interface with a ground surface. The sole can comprise a robot interface facilitating attachment of the sole to the robot. The system can further comprise a first sole component having a ground-contacting surface. The first sole component can define a first compliant zone of the sole. The sole can further comprise a second sole component having a ground-contacting surface. The second sole component can define a second compliant zone. The first sole component can have a compliance that is different than a compliance of the second sole component.

Also disclosed herein is a method for facilitating stable operation of a robot during locomotion. The method can include configuring a sole to comprise a first sole component having a ground-contacting surface to be supported on an appendage of the robot at a first zone, the first sole component being configured to support a hind foot region of the ground-contacting appendage of the robot, such as to facilitate a stable heel-strike event during locomotion of the robot. The method can further comprise configuring the sole to comprise a second sole component having a ground-contacting surface to be supported on the appendage of the robot at a second zone, the second sole component being configured to support a midfoot region of the ground-contacting appendage of the robot, such as to facilitate a stable flat-footed stance of the robot. The first sole component can comprise a compliance different than a compliance of the second sole component. The method can further comprise configuring the sole to comprise a third sole component having a ground-contacting surface to be supported on the appendage of the robot at a third zone, the third sole component being configured to support a forefoot region of the robot. The method can further comprise configuring the sole to comprise a fourth sole component having a ground-contacting surface, to be supported on the appendage of the robot at a fourth zone, the fourth sole component being configured to support a first lateral area of the ground-contacting appendage of the robot. The method can further comprise configuring the sole to comprise a fifth sole component having a ground-contacting surface, to be supported on the appendage of the robot at a fifth zone, the fifth sole component being configured to support a second lateral area of the ground-contacting appendage of the robot.

To further describe the present technology, examples are now provided with reference to the figures. FIG. 1A illustrates an exemplary robot or robotic system in the form of a wearable exoskeleton robot 100 that is gait-capable, as well as being capable of one or more stance-associated operations, or a combination of these. The term "gait-capable" is intended to refer to one or more types of movements relative to ground (or a surface modeling ground) that a robot can perform during operation. These can include, but are not limited to, gait-based locomotion movements, capabilities or operations, as well as gait-associated and/or stance-associated movements, capabilities or operations that a robot with any number of jointed appendages in contact with the ground (i.e., robotic limbs or legs having a ground contacting portion, such as feet or other ground contacting structures/assemblies) can perform during operation. Example gait-based locomotion or gait-associated movements, capabilities or operations can include, but are not limited to a walking gait, running gait, jumping, hopping, and others as will be apparent to those skilled in the art. Example stance-associated movements or capabilities or operations can include, but are not limited to standing (i.e., where the robot is capable of operating in an erect position), squatting, toe stance (i.e., support of the robot with only the forefoot section of a foot), transitioning movements between possible stances for the robot and others as will be apparent to those skilled in the art. The exoskeleton-type robot 100 shown is one example of such a robot, the exoskeleton-type robot 100 being a biped robot capable of bipedal locomotion, as well as one or more stance-associated operations, such as running, walking, jumping, hopping, standing, squatting, balancing on one leg, and others. Robots that are gait-capable and/or that are capable of one or more gait-associated and/or stance-associated operations can comprise bipedal robots, quadruped robots, and any others with any number of appendages (one or more appendages) in contact with the ground that are capable of standing, locomotion and/or positioning of the robot. Although many of the examples described herein are described as gait-capable, it will be appreciated that the following disclosure equally applies to robots that are one or more of gait-capable, capable of gait-associated operations, or capable of stance-associated operations.

Being an exoskeleton type, the robot 100 is designed and configured to be operated and to move in accordance with a bipedal gait cycle during locomotion that corresponds to human gait movements, namely a human gait cycle, as well as other stance-associated operations or capabilities that can be performed by a human (e.g., standing, squatting, jumping, hopping, sitting, running, pivoting, tilting, shifting weight on one or more appendages). Indeed, the robot 100 can be configured to be operated to facilitate one or more gait patterns, as well as to facilitate one or more capabilities. For example, the robot 100 can be configured to be operated to facilitate at least one of a walking gait pattern, a running gait pattern, as well as to facilitate operation of the robot 100 in a standing or other stance position, to achieve a squatting function, to achieve a toe stance function, and others.

Although the discussion below will focus on the exoskeleton-type robot 100 shown, this is not intended to be limiting in any way as the sole technology discussed herein can be utilized on any robot or robotic device capable of operating relative to ground where the robot is supported about the ground (or other ground-like surface). In one example, contemplated robots or robotic devices can be any robot or robotic device capable of both gait movements (i.e., gait movements for locomotion) and gait-associated/stance-associated operations (e.g., standing, squatting, toe stance), and particularly robots capable of these as facilitated by contact between the robot and a ground or surface, such as gait-capable robots. In another example, contemplated robots or robotic devices can be any robot capable of only one of these. More specifically, and as further discussed above, a gait-capable robot can comprise a robot or robotic device capable of gait movements for locomotion where the robot moves by using contact between a ground or surface and an appendage to propel the robot in a given direction on and about the ground or surface. With respect to a walking or running gait pattern, to perform this type of gait, the appendage of the gait-capable robot can contact a surface, exert force on the surface in a motion (e.g., foot roll) that propels the robot in a desired direction, be removed from the surface, and swing in a direction of desired motion in preparation for another surface contact. This pattern can be repeated in a gait cycle. In this example, the gait-capable robot can be mobile and self-propelled, such as with power actuated joints, a propulsion system (e.g., appendages and motors) and other components and systems. Such a robot can also be capable of other types of gait patterns (e.g., hopping, jumping gait patterns), as well as other gait-associated and/or stance-associated operations (e.g., standing, squatting, toe stance, pivoting, moving, shifting weight). In still another example, robots or robotic devices that are only capable of one or more or certain gait patterns are also contemplated.

A robot or robotic device utilizing a sole in accordance with examples described herein can be an autonomous robot, a tele-operated robot, a wearable exoskeleton, a humanoid robot, a non-humanoid robot, a legged robot, a robot having one or more appendage(s) for facilitating locomotion, a surface-contacting locomotion-capable robot, or any other robot as understood by those of skill in the art. Additionally, the number of appendages is not intended to be limiting. A robot or robotic device having one appendage or a robot having more than one appendage can utilize the sole on one or more appendages to facilitate a gait or gait-associated and/or stance-associated operations. Although examples described below are described as gait-capable robots, it will be appreciated that the exemplary robots described herein may be gait-capable, stance capable, or capable of one or more gait-associated or stance-associated operations or any combination of the above.

Turning now to the example exoskeleton-type robot 100 shown, it can be seen that the robot 100 can comprise one or more appendages, which in some examples can be jointed appendages, such as a right jointed appendage 102 and a left jointed appendage 104. The left and right jointed appendages 102 and 104 can comprise a ground contacting or ground interfacing portion of the gait-capable robot configured to support the robot 100 relative to ground or any other surface, and to facilitate the gait-based locomotion movements and the gait-associated and/or stance-associated capabilities of the robot 100. The lowermost ground contacting and interfacing portion of the gait-capable robot can be part of an appendage, such as the left and right jointed appendages 102 and 104, of a robot, such as the robot 100, and in a more specific example, can comprise a foot or can operate in a manner similar to a human foot during a gait cycle. The ground contacting appendage of a robot can be part of a more complex appendage in support of a body of a robot. For example, as shown, the left and right jointed appendages 102 and 104 can be part of a more complex appendage, namely left and right limb or leg appendages, respectfully, of the exoskeleton shown.

Figure 1B:
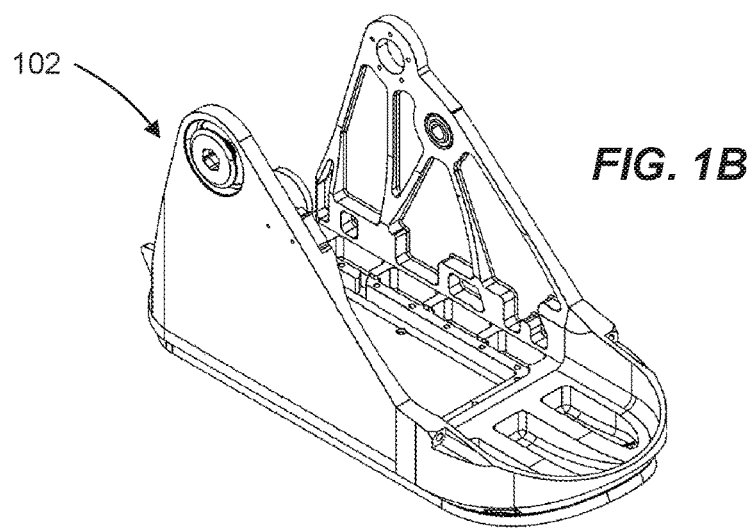
FIGS. 1B, 1C, and 1D respectively illustrate an isometric view, a side view, and a rear view of a lowermost appendage of the robot of FIG. 1A in the form of a robotic appendage or foot, these indicating and defining various regions of the appendage in accordance with an example of the present disclosure.
Figure 1C:
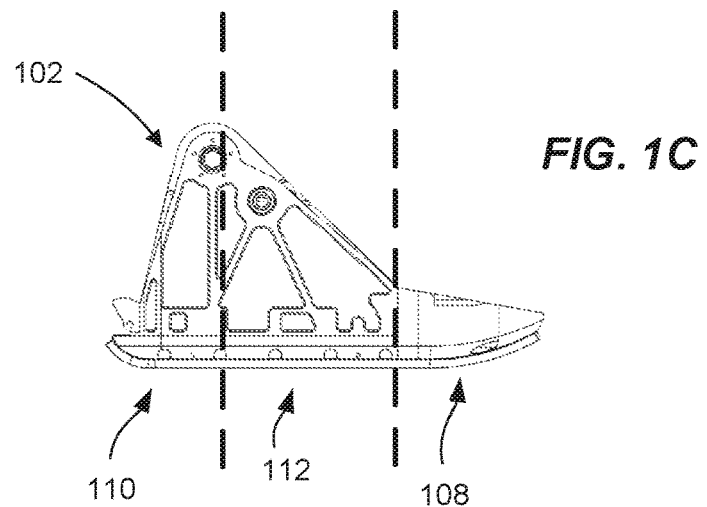

Areas of the ground contacting left and right jointed appendages 102 and 104 of the robot 100 can be referred to using common terms used to refer to parts of a human foot. For example, FIG. 1B illustrates an isometric view of the exemplary appendage 102 of the robot 100 in the form of a foot or foot-like structure or assembly operable to receive a foot plate or boot binding (not shown) and configured to receive and support a human foot, such as in a boot of a user donning the exoskeleton. It is to be understood that the appendage can further be an appendage of a humanoid or other type of robot that is not a wearable exoskeleton. FIG. 10 illustrates a side view of the exemplary appendage 102. As illustrated in FIG. 10, the appendage 102 (the same being the case with the appendage 104) can comprise a forefoot portion or region 108, a hind foot portion or region 110, and a midfoot portion or region 112. The forefoot portion 108 can be defined by a region beginning at a front edge of the appendage 102, and extending towards a rear of the appendage 102. The hind foot portion 110 can be defined by a region beginning at a rear edge of the appendage 102 and extending toward a front of the appendage 102. The midfoot portion 112 can be defined by a region extending between the forefoot portion 108 and the hind foot portion 110. The forefoot portion 108, the hind foot portion 110, and the midfoot portion 112 can correspond to the forefoot, hind foot, and midfoot portions or regions of a human foot donning the exoskeleton.

Figure 1D:
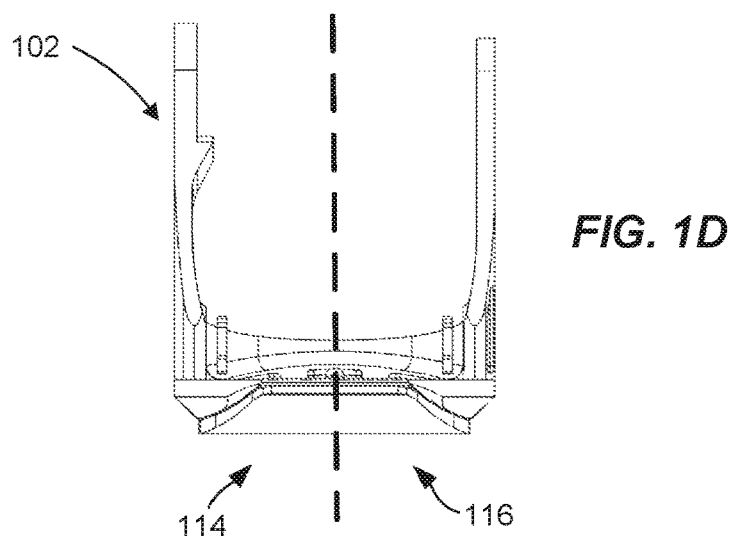

FIG. 1D illustrates a rear view of the exemplary appendage 102 of the robot 100. As illustrated in FIG. 1D, the appendage 102 can further be divided into and comprise a first lateral portion 114 and a second lateral portion 116. As divided as shown in FIGS. 10 and 1D, and as will be apparent to those skilled in the art, each of the forefoot, hind foot, and midfoot portions 108, 110, 112, respectively, of the appendage 102 can be divided into a first lateral portion (e.g., in some examples, this can comprise a medial portion) and a second lateral portion, such as the first lateral portion 114 and the second lateral portion 116. Similarly, the first lateral portion 114 and the second lateral portion 116 can each include a forefoot, hind foot, and midfoot portion therein.

As will be appreciated by those skilled in the art, the appendages of a robot or robotic device operable to support the robot or robotic device about a ground or other surface, and to facilitate gait, or stance-associated movements and operations are not limited to being configured as shown, or to comprise a boot binding operable to receive and support a booted human foot. Indeed, several different shapes and configurations of appendages are possible and contemplated, such as for gait-capable robots other than wearable exoskeletons (e.g., humanoid robot, quadruped robot, others).

As will be described in more detail below, a sole comprising one or more sole components can be attached to one or more of the appendage(s) 102 and/or 104 of the robot 100 to provide support for and stabilization of the appendage(s) and the robot 100, as well as to provide additional advantages and benefits as will be described herein and apparent to those skilled in the art. Each sole component of the sole can provide at least partial support to one or more areas (e.g., forefoot, midfoot, hind foot, first lateral portion, second lateral portion) of the appendage of the robot 100 to which the sole is attached.

Figure 2:
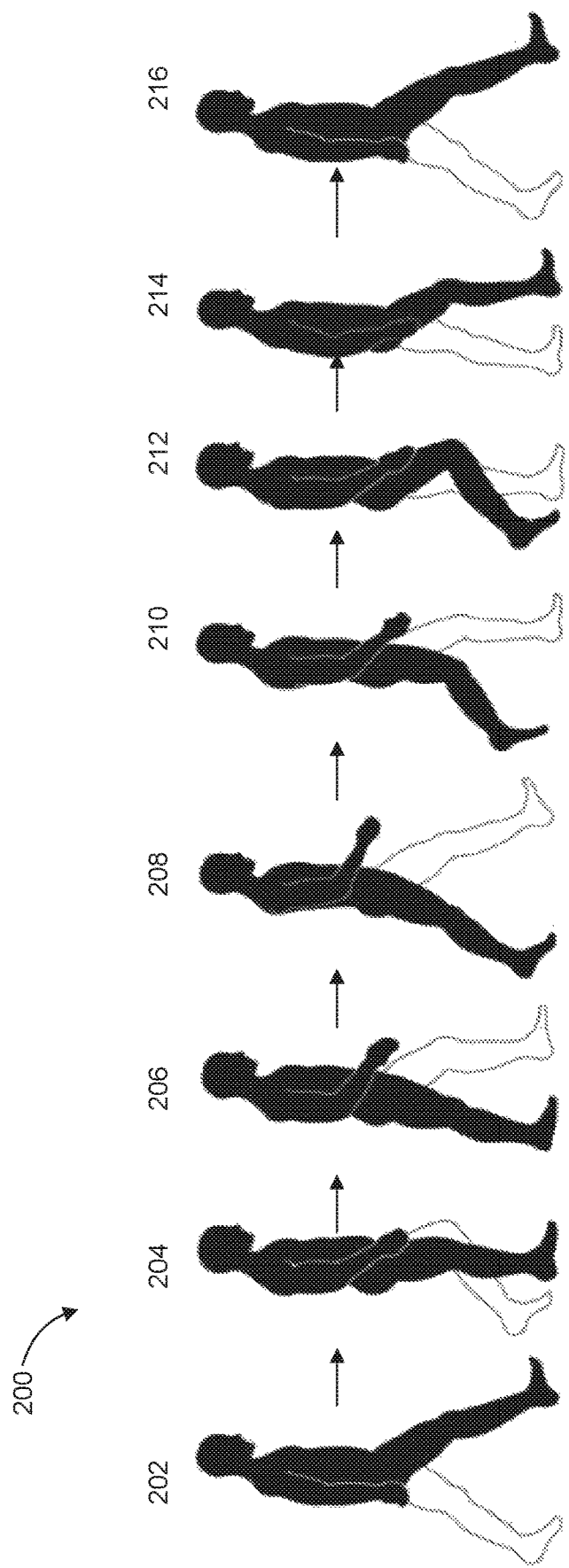
FIG. 2 illustrates various stages and body stances in a walking gait cycle of a human and/or a robot.

FIG. 2 illustrates a common sequence of events and stances used to describe a human walking gait cycle. To mimic human movement and human appearance, humanoid robots and robotic human-wearable exoskeletons can be designed and manufactured to perform locomotion in a manner similar to that of human beings, such as walking, running, jogging, hopping, jumping, and so forth. Gait-capable robots can be designed to be gait-capable similar to human beings and can perform gait cycles similar to the gait cycles commonly characterized for human beings, for example, walking, running, jogging, or others. In other words, the walking gait cycle illustrated in FIG. 2, although depicting a human walking gait, can also be used to model a typical gait cycle of a gait-capable robot, such as a gait-capable exoskeleton. Furthermore, it will be understood by those of ordinary skill in the art, that running, jogging, skipping, and other gait-type movements or operations are contemplated herein even though FIG. 2 is specifically directed to a walking gait. The impacts in a typical gait cycle and concepts related thereto are covered and illustrated with reference to the walking gait cycle of FIG. 2. As shown, FIG. 2 illustrates a complete walking gait cycle 200 from an initial contact of a heel of a right foot with the ground to a next subsequent contact with the heel of the right foot against the ground. As is well known, there are several different phases, stances and motions of a body within the complete walking gait cycle, each of which will be briefly described below.

In the cycle, step 202 illustrates an initial contact between a foot and the ground. In this case the initial contact is a heel strike of the right heel against the ground with the toe of the right foot being separated from the ground. Following the heel strike and foot roll, the right toe contacts the ground and, in a loading response, the body shifts the weight of the body from a left foot to the right foot and enters a flat-footed stance where the right foot is flat against the ground and supporting the weight of the body. This is the single leg support portion of the stance phase of the walking gait cycle. The flat-footed stance is known as a mid-stance and is shown in step 204 of the gait cycle in FIG. 2. Step 206 shows the left leg swing phase of the gait cycle. As the left leg swings forward to take a step the right foot continues to roll until the right toe leaves the ground and propels the body forward. As the left foot contacts the ground in a heel strike, the heel of the right foot is off the ground and the toe of the right foot pushes off the ground in a toe-off event, or pre-swing stance, shown in step 208. The gait cycle continues as the right leg is lifted off the ground and swings forward, as shown in steps 210, 212, and 214. During the swing steps of the right leg, the left leg and foot support the weight of the body. Finally, the gait cycle completes as the right leg touches the ground again with a heel-strike as shown in step 216, which is substantially the same as the stance shown in step 202.

Figure 3:
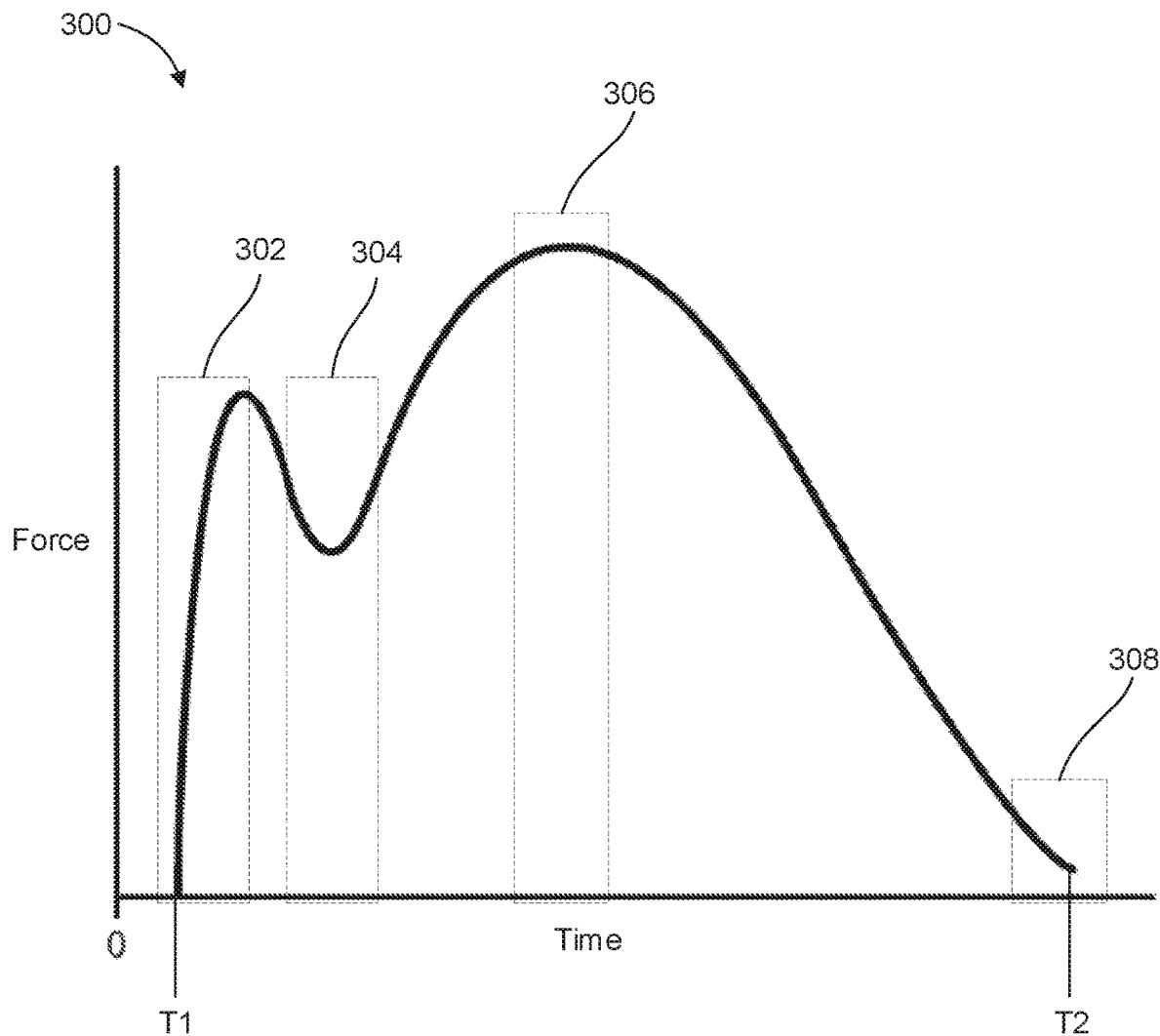
FIG. 3 illustrates a graph of the normal forces acting on a robotic foot over time during a gait cycle of a human and/or a robot.

Each stance or motion of the gait cycle results in different forces and/or impacts acting upon a body of a human or robot performing locomotion with the illustrated gait cycle. FIG. 3 shows a diagram illustrating various forces acting on a foot of a body during a complete gait cycle over time in a Force-Time graph 300. Specifically, FIG. 3 illustrates vertical forces acting on a single foot (e.g., the right foot) between when the foot initially hits the ground (e.g., see heel-strike at step 202 in FIG. 2) until the foot leaves the ground (e.g., see toe-off at step 210 in FIG. 2). The forces acting on a foot during a gait cycle are substantially the same for both the right foot and left foot. Therefore, the cycle of, and forces acting on, only one of the feet during a gait cycle is shown and discussed with respect to FIG. 3.

With reference to the gait-cycle of FIG. 2 and the Force-Time graph of FIG. 3, the initial increase of force is caused at a time T1 when the heel of the foot contacts the ground during a heel-strike event. The impact of the heel-strike event causes a rapid increase of force on the foot over a small period of time as shown in the time period 302. As the cycle continues, the force on the foot decreases after the heel-strike event as the midfoot and forefoot contact the ground and the force of the foot on the ground is distributed over a larger area. This decrease in force is shown in time period 304. At the bottom of a trough in time period 304 of FIG. 3, the force begins to gradually increase on the foot over time. While not shown, this gradual increase is due to the left foot lifting off the ground and swinging forward, thereby causing more weight or force during the gait cycle to be shifted to the right foot. The force on the foot reaches a maximum (shown in time period 306 of FIG. 3) at or near the mid-stance shown as stance 204 in FIG. 2. Following the mid-stance 204, the right foot gradually lifts off of the ground as the weight of the body shifts forward to the left foot which is swinging forward to catch the weight of the body in the gait cycle. As the right foot gradually lifts off the ground, the foot moves to a toe-off event in which the toe leaves the ground and all force acting on the right foot is released. The toe-off event is shown at time T2 within time period 308 of FIG. 3, at which point the right foot is no longer contacting the ground.

FIG. 3 illustrates the typical force profile on the robot resulting from forces acting along the direction of a gravity vector. In other words, the illustration of FIG. 3 is limited to vertical forces acting on the foot of the robot while walking on a flat surface. However, it will be appreciated that a component of the force in the ground plane (e.g. acting along the plane of the sole) is not shown. However, it will be appreciated by those skilled in the art that a vertical force from the ground and a horizontal force from the ground will both be acting on the sole of the robot 100. Both the vertical and horizontal forces acting on a foot/sole during a gait are commonly illustrated in butterfly (Pedotti) diagrams. In practice of designing and implementing the soles described herein, the sole material, a traction "tread" pattern, and compliance characteristics of the sole are selected to control the vertical impulse force acting on the sole as well as to achieve a desired traction level to facilitate proper traction and interaction between the sole and a surface when operating on various surfaces and in various environments. In other words, in addition to material and compliance considerations, it is also helpful to control the traction (i.e. the forces applied by the foot in the ground plane) to ensure proper locomotion of a robot wearing a compliant sole. Traction, or forces applied by the foot in the ground plane, can be controlled in a variety of ways as will be understood by those skilled in the art. However, the present disclosure contemplates being able to provide the same or different traction control parameters in a single sole. For example, the compliant soles discussed herein can comprise one or more sole components, each comprising the same traction "tread" pattern, or one or more sole components comprising different traction "tread" patterns.

As shown in FIG. 3, various levels of forces, acting over various different amounts of time are acting on a foot during a gait cycle. The heel-strike event at time period 302 shows a large spike in force on the foot acting over a relatively short period of time. In mechanics, a force applied over a period of time is defined as an "impulse". Typically, a high force applied to an object over a short period of time will result in perturbation having a broader frequency spectrum on the object than a lower force applied to the object over a proportionally longer period of time, even when the impulse is the same in both cases. In spectral analysis, in order to reproduce a signal (in this case a force) that takes place over a short time interval, a higher frequency part of the spectrum must be recruited. With respect to robots, such as robot 100, as a result of the high impacts (i.e. short duration impulse) caused in heel-strike events, if the forces of the impact are not well absorbed in the collision, these will cause the forces with high frequency components to propagate throughout the robot. Due to the propagation of forces from the high impacts throughout the robot, interference, perturbation, and disturbances can be caused in various systems of the robot. How said disturbances are caused is described below.

Robots can typically operate via use of a plurality of actuators and motors used to control and move various degrees of freedom and appendages in a robot. Sensors can also be placed throughout the robot to sense forces on the robot caused by movement and actuation of the motors. A control system of the robot can control each actuator/motor based on the forces sensed by each sensor in order to control the robot to move and operate in a stable and predictable way.

In order to achieve stable and predictable operation of the robot, control systems within the robot generally operate as closed loop systems with negative feedback loops such that the robot follow desired commands while rejecting external disturbances, such as outside forces which act as perturbations on the the system. The key difference between positive and negative feedback is their response to change being that positive feedback amplifies change in the system while negative feedback reduces change in the system.

The negative feedback loops in a robot generally operate with high loop gains in order to track commands accurately and with a short response time while at the same time filtering out external disturbances such as outside forces.

The closed loop gain can be described as an amplification factor of the (feedback) error signal (i.e. it amplifies the difference between the command signal and the actual response of the system to this command). Gain is one of the parameters adjusted as part of a closed loop feedback system in order for the system output to follow the desired command. A closed loop feedback system attempts to accomplish the desired output based on a given parameter or combination of parameters that comprise the feedback controller. If the closed-loop gain is "too low" then the system will not achieve the desired output and will respond slowly, and if the gain is "too high", then the system will overshoot the desired output and may even exhibit unstable response in which case small perturbations may uncontrollably grow in time—this may occur, for example if the closed-loop response of the system becomes sufficiently out of phase with its command to behave as a positive feedback loop. In the case of an actuator that is attempting to produce an output force that follows a desired force trajectory, an optimal gain would make the actuator output the exact desired force profile. In real world applications, it is possible to get close to the desired force profile. However, various factors make it difficult to achieve the exact desired force profile, such as resonant frequencies of the individual and combined collection of components in the robot, actuator behavior being variable and unpredictable, and sensor inadequacies, such as improper calibration. If an actuator overshoots a desired force profile then there is a risk that, if the overshoot is too large, the overshoot will be viewed as a signal or a command to the actuator. In such a case, the system detects an output that is not what is desired, as a signal and tries to correct the overshoot. If the system is operating with a gain that is too high, then the correction for the overshoot will itself have the possibility of overshooting in the other direction, i.e., the direction of correction for the initial overshoot. At this point the system can go into an unstable state where the system repeatedly oscillates between overshooting up and overshooting down.

Accordingly, with negative feedback loops operating with high loop gains, a robot, such as a gait-capable robot, a robot capable of one or more gait-associated, and/or stance-associated operations, is susceptible to instability and oscillations/vibrations within the system. An instability can occur as a result of an impact between a ground supporting appendage (e.g., a foot) of the robot and the ground, such as during locomotion (e.g., one or more gait-based locomotion movements) or during other operations (e.g., gait-associated or stance-associated movements) of the robot. For example, a gain in a gait-capable robot or robotic system can be adjusted to be as high as possible while still having a stable system when the robot or robotic system is walking on a compliant surface, (e.g., a rubber mat). If the robot or robotic system were to transition from walking on the compliant surface to walking on a less compliant surface, then when heel-strike occurs between the robot or robotic system and the less compliant surface, the transient force that get sent through the robot or robotic system will be of higher magnitude and of shorter duration than the transient force sent while walking on the more compliant surface. The higher impact force and short pulse can be perceived by the robot or robotic system as being something that the robot or robotic system needs to correct, but cannot achieve using close-loop controllers develop for a robot or robotic control system design to correctly respond to impact generated while walking on a more compliant surface. Accordingly, the heel strike event on the less compliant surface produces an impulse similar to the previously-described overshoot, thereby causing the robot or robotic system to enter an unstable oscillation in an attempt to correct the overshoot. In other words, when a hard surface of the robot foot impacts a hard ground or locomotion surface, a high impulse propagates through the robot or robotic system. The harder the surface, the more an impact can resemble a step function, or in other words, a spike in load that the robot or robotic system attempts to correct.

High impulses can be sensed by various force sensors within the robot or robotic system. Thus, it is possible that a high impulse can be interpreted by the force sensors and any associated control system or systems as a control signal within the robot or robotic system instead of an outside force. When one or more sensors interpret the force as a signal, the corresponding sensor signal(s) can cause the control system(s) to drive the actuators or motors to provide a force in response to the impulse. The high gain can cause the response to the high impulse to act quickly and overshoot the steady state operating condition of the robot or robotic system and cause a rapid back and forth response drive on the motors and actuators. This rapid back and forth can result in an undesirable oscillation or vibration within the drive system of the robot or robotic system. The typical resonant frequency of robots is low enough that it becomes susceptible to easy excitation of oscillations and vibrations within the system by high impulses.

Additionally, high impulses and impacts on the robot or robotic system can comprise a high frequency component that a closed loop controller may be unable to respond to adequately. Impulse forces that a robot or robotic system experiences, for example during a heel strike event, have energy/force content over a given frequency range (i.e. frequency bandwidth) that is roughly proportional to the inverse of the time duration of the impulse. In practice, actuators and controllers are designed to achieve accurate (i.e. the desired force profile is produced) and stable (i.e. overshoots are small compared to the magnitude of the impulse and residual oscillations decay rapidly) closed loop control over a wide frequency range. However, closed-loop controllers can have limitations that can cause the control system to not respond effectively to perturbations/impulses that have significant energy content at frequencies that exceed the closed-loop control frequency bandwidth. As a result the negative feedback loops can behave as positive feedback loops in the presence of high frequency, high impact impulses, which cause disturbances, perturbations, oscillations, and vibrations to grow over time.

The electronically controlled components of the robot or robotic system can be suitably programmed and tuned to filter out outside perturbations and disturbances, such as impact impulses, on the robot. However, to alleviate the disturbances to the robot or robotic system without complicating the tuning and programming of the electronically controlled components of the robot or robotic system, it can be beneficial to include a "mechanical filter" to absorb the impulses on the robot and lessen their effect before being registered by one or more sensors of the robot or robotic system.

In order to minimize disturbances and perturbations caused by impacts on an appendage of the robot 100, a ground contacting compliant sole, in accordance with examples of the present disclosure, can be attached to or integrally formed with one or more appendages of the robot 100 to act as a mechanical impulse filter to cushion and mitigate forces of impacts impinging on the appendages of the robot, such that any forces and resulting impulses propagating through the robot 100 are lessened and do not negatively impact the performance of the robot 100. The compliant sole allows the robot 100 to effectively traverse and operate on what amounts to a compliant surface, regardless of the type of actual ground or surface with which the robot 100 may be currently interfacing. Forces acting on the robot 100, such as those caused during a gait-based locomotion or gait-associated and/or stance-associated movement of the robot 100, such as those encountered at and shortly after heel strike, can be mechanically "filtered out," mitigated, and spread out over a larger period of time. Accordingly, the magnitude of the impulses received from interfacing with non-complaint ground surfaces can be lessened by the compliant sole by having the compliance of the sole lower the peak force of the impulse experienced. When the peak force of the impulse is lowered, it is equivalent to spreading the impulse over a longer duration (i.e., a longer wavelength, or equivalently, a lower frequency). The energy of contact is a constant, but the time interval over which the impulse is experienced can be made longer, and the peak lower, by providing the robot 100 with a compliant sole having at least one compliant material.

By reducing the bandwidth of impulse forces and frequencies (i.e. spreading the impulse over a longer time) the closed-loop controllers of the robot 100 can more effectively compensate for impulses/perturbations acting on the robot 100. The compliant sole operates to advantageously reduce the magnitude of those perturbations with significant energy/force content at high frequency. It follows that by having, for example, a heel portion of the compliant sole of the robot 100 equipped with a compliant material the duration of the impulse will be longer and the frequency content smaller than if the heel portion were less compliant. As a result, the impulse forces and frequency bandwidth achieved using the compliant sole will be lower than that achieved using a less compliant sole (or no sole at all (e.g., a metal ground contacting appendage) and will be adequately compensated by the system. The examples of the present disclosure of compliant soles for the robot 100 can act to facilitate stable operation of the robot 100 during locomotion by mitigating impacts and transient forces on the robot 100, thereby minimizing disturbance and instability within the robot 100. Furthermore, by equipping the sole with variable compliance regions over its surface other desirable characteristics, such as responsive force and moment transfer while standing with one or both feet on the ground may also be achieved.

Figure 4:
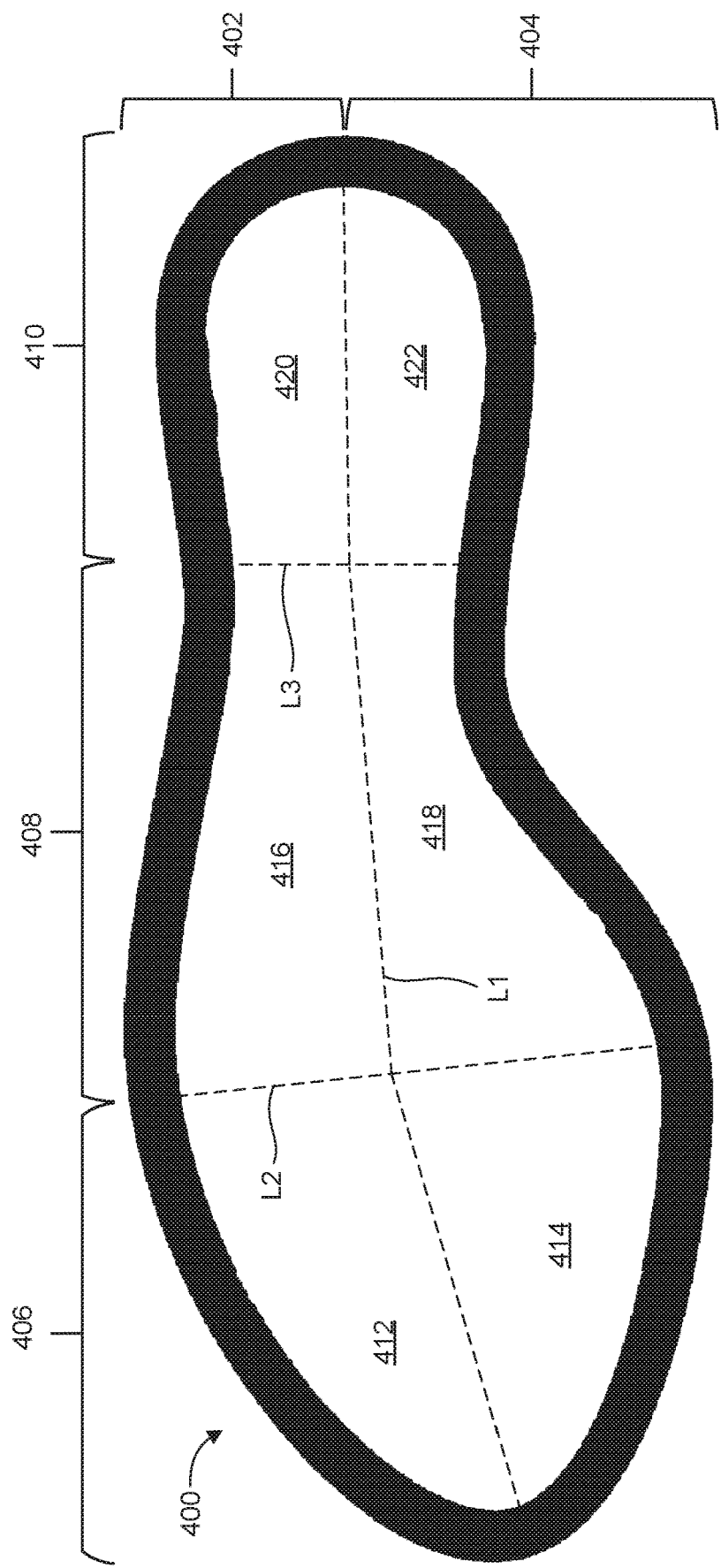
FIG. 4 illustrates a graphical example compliant sole for a robot, such as the robot of FIG. 1A, the sole being shown partitioned into different regions and sections.

FIG. 4 illustrates a view of a compliant sole 400 configured to be attached to an appendage of a robot, such as the appendages 102 and 104 of the robot 100 shown in FIGS. 1A-1B. As shown in FIG. 4, the sole 400, and any sole in accordance with examples of the present disclosure, can be in a shape of a human foot. In other examples, the sole 400 (and any of the example soles discussed herein) can be of any size, shape, and/or configuration to be operable with an appendage of a robot. The sole 400 can be a similar configuration or shape as the appendage or the sole 400 can be of a different configuration or shape than the appendage. In other words, the present disclosure is not intended to limit the size, shape and/or configuration of the sole 400 (or any other example sole) discussed herein.

As in the example shown, the sole 400 can be divided into sections. Line L1 divides the sole 400 into a first lateral section 402 and a second lateral section 404, line L2 divides a forefoot section 406 from a midfoot section 408, and line L3 divides a hind foot section 410 from the midfoot section 408. The forefoot section 406 can comprise a first lateral forefoot section 412 and a second lateral forefoot section 414. The midfoot section 408 can comprise a first lateral midfoot section 416 and a second lateral midfoot section 418. The hind foot section 410 can comprise a first lateral hind foot section 420 and a second lateral hind foot section 422. Additionally, the first lateral section 402 can comprise the first lateral forefoot section 412, the first lateral midfoot section 416, and the first lateral hind foot section 420. The second lateral section 404 can comprise the second lateral forefoot section 414, the second lateral midfoot section 418, and the second lateral hind foot section 422.

It is to be understood that the demarcations of sections of the foot by lines L1, L2, and L3 need not necessarily be located exactly as shown in FIG. 4. The midfoot 408 can be as shown or can extend farther forward or farther backward on the sole 400. Likewise, with a possible expansion or contraction of the defined midfoot 408, one or more of the forefoot 406 and/or the hind foot 410 can be defined as larger or smaller on the sole/foot. In other words, lines L2 and L3 can be defined further forward on the sole/foot or further backward on the sole/foot in order to change sizes of each section of the sole/foot. Similarly, line L1 need not be disposed in a middle of the sole/foot and the first lateral 402 and second lateral sections 404 need not be the same or similar in size. Line L1 can be moved either to the first lateral side or to the second lateral side in order to define different sizes and shapes of the first lateral and second lateral sections of the sole/foot. In other words, the forefoot section 406 can be of any size located in front of and/or up to a frontal or coronal plane of the foot and the hind foot section 410 can be of any size located in in back of and/or up to a frontal or coronal plane of the foot. Similarly, the foot can be divided up into the first lateral section 402 and the second lateral section 404 along any parasagittal plane that intersects the foot or any straight or curved or sectioned line that divides the foot into first lateral and second lateral sides. It is noted that the appendages 102 and 104 of the robot 100 can also comprise sections substantially corresponding to the sections of the sole 400. In other words, the appendages 102 and 104 of the robot 100 can also comprise a forefoot region, a hind foot region, a mid foot region, a first lateral region, and a second lateral region.

FIGS. 5A-5I illustrate, graphically, respective bottom views of various example compliant soles (e.g., compliant soles 500A-500I) that can be utilized with the robot 100. As shown in each of FIGS. 5A-5I, the compliant soles can each comprise one or more sole components with each sole component defining a compliant zone of the respective compliant sole.

The term "sole" or "compliant sole," as used herein, refers to a ground contacting and interfacing device operable with and configured to be supported on an appendage of a robot, such as the robot 100, and that comprises one or more sole components. In one example, a sole can comprise one or more sole components that are configured to attach directly to an appendage of the robot 100 via a robot interface of the sole in the form of one or more interface surfaces of one or more respective sole components. In another example, a sole can comprise a frame component and one or more sole components that are attached to the frame component of the sole. In this example, the frame component can comprise the robot interface that facilitates attachment of the sole to the appendage of the robot 100 via the frame component.

A "sole component" as used herein refers to a component of an associated compliant sole operable with the robot 100, the sole component being made of at least one compliant material and having at least one degree of compliance (i.e., at least one compliance zone). A sole component can be configured with and to define a ground-contacting surface that contacts the ground and that is operable to function as the lowermost interface between the robot 100 and the ground or other surface upon or about which the robot 100 is operated. In other words, the sole components of an associated compliant sole can each comprise and define a ground contacting surface intended to be in physical contact with the ground or other surface upon or about which the robot 100 is operated. Each sole component of an associated compliant sole can further comprise an interface surface comprising a non-ground contacting surface. In one example, the interface surface can comprise and function as a robot interface that interfaces directly with the appendage (e.g., foot) of the robot 100. In another example, the interface surface of a sole component can interface with a frame component of the compliant sole, wherein the sole component is supported on the frame component. In this example, the frame component can comprise the robot interface that facilitates attachment and use of the sole with the robot.

The term "robot interface" refers to the structural components or elements of the sole that are configured to interface with an appendage of a robot to facilitate attachment of the sole to the robot 100. The robot interface can facilitate attachment using various attachment means, such as fasteners, fastening systems (e.g., quick-release system), hook and loop fasteners, adhesives, or a combination of these. In one example, the robot interface can comprise the non-ground-contacting interface surfaces of one or more respective sole components, where the sole components are configured to attach directly to the appendage of the robot 100. In another example, the robot interface can comprise one or more portions, structural elements, systems, or surfaces of or supported by a frame component of the sole that is configured to facilitate attachment of the sole to the appendage of the robot 100. In this example, the frame component can further comprise a sole component surface configured to receive and support one or more sole components of the sole.

The material of any sole component can be chosen to provide specific desired material properties to the compliant sole and impact properties to cushion impacts between the sole and the ground surface. A compliant sole can comprise one or more sole components that can be formed from the same or different materials. In addition, a single sole component can be formed from one or more materials. The material of any sole component can comprise a certain material stiffness measured in force (measured in Newtons, for example) divided by an amount of displacement caused by the force (measured in meters, for example). The material can further comprise a certain material compliance, which is the inverse of stiffness. The compliance can be measured in displacement (measured in meters, for example) divided by an amount of force that caused the displacement (measured in Newtons, for example). As used herein, "compliance" can broadly refer to the displacement of a material under a given force. However, the term "compliance" can more specifically refer to the compliance, force damping, and or non-linear mechanical impedance characteristics of a material, meaning, but not limited to, how effective the material is at absorbing an applied force (i.e., damping), the materials resistance to motion under an applied force (e.g., impedance), and the materials resistance to deformation under an applied force (e.g., stiffness/compliance). In other words, the more compliant a material is, the more effective that material is at damping an impulse due to deformation under an applied force.

A location of any sole component of any compliant sole can determine which forces will be cushioned by that particular sole component. For instance, a sole component at a front/toe region of an appendage 102 or 104 (e.g., foot) of the robot 100 can be configured to absorb impacts on the toe of the robot 100 during a gait cycle. A sole component located at a heel region of the robot 100 can be configured to absorb impacts during a heel-strike in the gait cycle, and so on. Additionally, a sole component can provide at least partial support to a section of the appendage (e.g., foot) of the robot 100 during locomotion or stable standing of the robot 100. The material, stiffness, and compliance of a sole component can be selected based on the amount of force to be cushioned at the location of the sole component of the compliant sole for any given operation or collection or operations of the robot 100.

As indicated above, various examples of compliant soles are illustrated and described with reference to FIGS. 5A-5I, each of which are operable with a robot, such as the robot 100 in the form of an exoskeleton. For reference, FIG. 4 described above defines various regions of a compliant sole that can be used to refer to locations of the various sole components of the respective compliant sole examples illustrated in FIGS. 5A-5K.

Figure 5A:
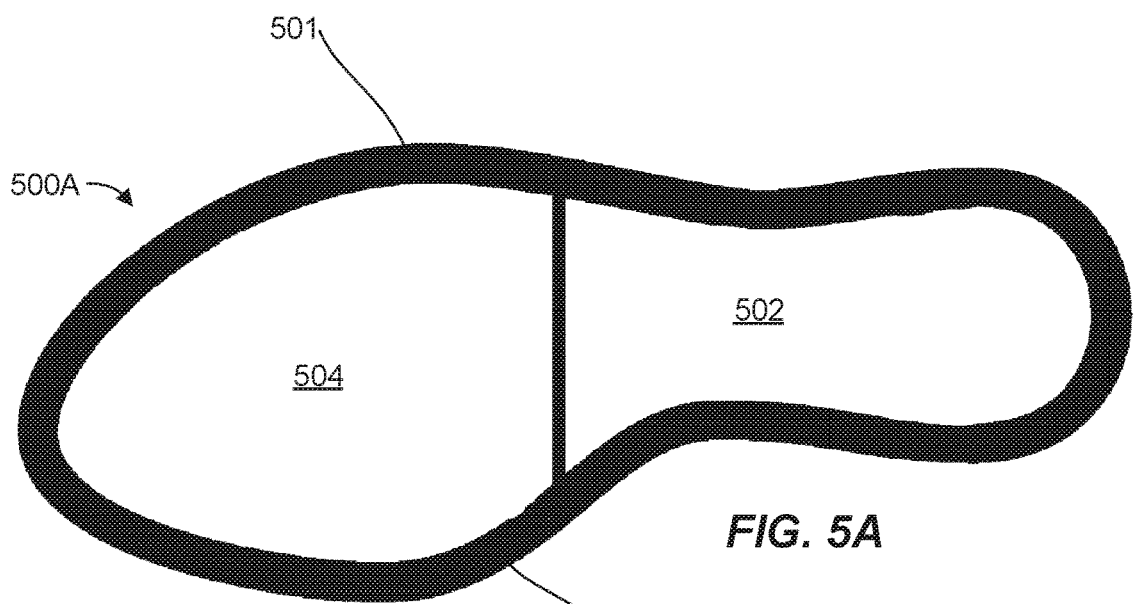
FIGS. 5A-5K illustrate various graphical examples soles for a robot, such as the robot of FIG. 1A, including different configurations of sole components on each sole in accordance with examples of the present disclosure.

FIG. 5A illustrates an example of a sole 500A operable with a robot, such as the robot 100. As shown, the sole 500A can include two sole components comprising a first sole component 502 and a second sole component 504, respectively defining first and second compliant zones of the sole 500A. As shown in FIG. 5A, the first sole component 502 can be disposed at a rearward area of the sole 500A, or in other words, at a heel or hind foot section (e.g., see hind foot section 410 of FIG. 4) of the sole 500A. When attached to an appendage of a robot (e.g., one or both of the first and second appendages 102 and 104 of the robot 100 of FIGS. 1A-1D), the first sole component 502 can be at least partially aligned with and disposed under the hind foot, the midfoot, or both the hind foot and midfoot of a ground-contacting appendage of the robot. As such, during various gait-based, or gait-associated and/or stance-associated movements or operations of the robot, the first sole component can provide at least partial support to the hind foot of the ground-contacting appendage of the robot. The first sole component 502 can further provide at least partial support to the midfoot of the ground contacting appendage or can only be disposed to provide at least partial support to the hind foot of the appendage. The first sole component 502, being located in a hind foot region of the sole 500A, can be configured and positioned to absorb impacts to the heel (and in some examples and situations also to the midfoot) during operation of the robot.

As shown in FIG. 5A, the second sole component 504 can be positioned adjacent the first sole component 502, at least partially within a forefoot region (e.g., see forefoot region 406 of FIG. 4) and the midfoot region (e.g., see midfoot region 408 of FIG. 4) of the sole 500A. When attached to an appendage of a robot (e.g., one or both of the first and second appendages 102 and 104 of the robot 100 of FIGS. 1A-1D), the second sole component 504 can be at least partially aligned with and disposed under the forefoot, or the midfoot, or both the forefoot foot and midfoot of a ground-contacting appendage of the robot. As such, during various gait-based, gait-associated and/or stance-associated movements and/or operations of the robot, the second sole component 504 can provide at least partial support of the forefoot of the ground contacting appendage of the robot. The second sole component 504 can further provide at least partial support to the midfoot of the ground-contacting appendage or can be disposed to provide at least partial support to the forefoot and midfoot of the appendage. The second sole component 504, being located in a forefoot region of the sole 500A, can be configured and positioned to absorb impacts to the toe during operation (e.g., locomotion) of the gait-capable robot.

It is noted that each of the sole components described herein in accordance with the several examples set forth in the present disclosure can define a compliant zone. Each respective compliant zone defined by the various sole components represents an area of the sole comprising a particular compliance. The compliance of each compliant zone can be determined based on the material chosen for each sole component, which defines the compliance of the particular compliance zone defined by a particular sole component. Each compliant zone of a sole according to any of the example soles discussed herein can have a same compliance as all other compliant zones or one or more compliant zones can have a different compliance from one or more other compliant zones. Additionally, two or more compliant zones can have a same compliance while all remaining compliant zones are different from the compliance of the two or more compliant zones. For example, materials for the first sole component 502 and the second sole component 504 can be chosen based on various material properties including stiffness, compliance, hardness, tensile strength, elasticity, etc. Materials and tread patterns can be chosen based on a particular goal or function to be achieved by a particular sole component. Any materials and tread patterns can be chosen to be used for sole components such as, for example, closed-cell and open-cell foam, rubber, PVC, polyurethane, thermoplastic polyurethane, EVA foam, petroleum rubber, Vibram type soles, and others as will be apparent to those skilled in the art. Furthermore, sole components can be made of homogenous materials, composite materials, and can further comprise a compliant material frame (e.g., a honeycomb structure) surrounding a stiffer material disposed therein.

For example, the first sole component 502 can comprise a material that is more compliant than a material of the second sole component 504. For instance, the first sole component 502 can be disposed at a hind foot of the appendage in order to absorb impacts, forces, and shocks to the heel of the appendage during a heel-strike event of a gait cycle. In contrast, the second sole component 504 can be disposed at a forefoot and/or midfoot of the appendage in order to facilitate stable standing of the robot when the robot is not moving. As such, the first sole component 502 can be made of a first material having a greater compliance than the compliance of a second material of the second sole component 504. With this material configuration, the relative compliance of the first sole component 502 can allow the first sole component 502 to absorb impacts to the heel during a gait cycle, and the relative stiffness of the second sole component 504 can provide a stiffer material to better support standing of the robot compared to the first sole component 502.

The material configuration just described is exemplary and does not limit the sole 500A from comprising other possible material configurations. For example, in a gait cycle including toe strike events, the second sole component 504 can comprise a more compliant material than the first sole component 502. Additionally, compliances of the first and second sole components 502 and 504 can be different from each other or they can be the same as each other. Choice of material can be design specific in order to facilitate a particular purpose or a particular design of the sole 500A and/or the robot.

Figure 5B:
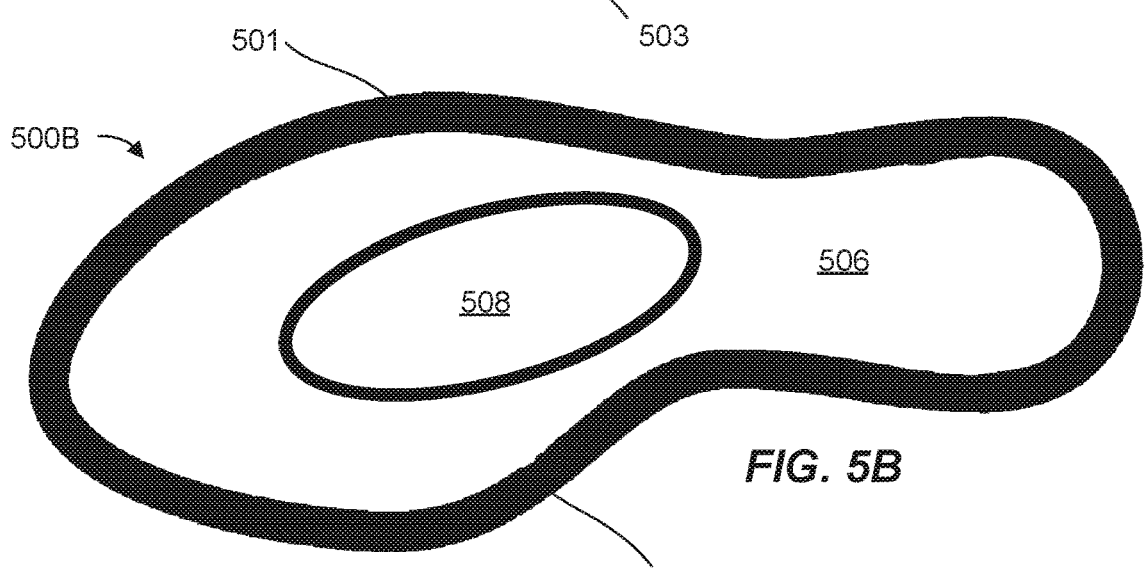

FIG. 5B illustrates a sole 500B for a robot in accordance with an example of the present disclosure. The sole 500B can comprise a first sole component 506 disposed around an outer perimeter of the sole 500B, substantially located within forefoot, midfoot, hind foot, first lateral, and second lateral regions of the sole. The sole 500B can comprise a second sole component 508 disposed substantially in a middle of the sole 500B in a midfoot region. The first sole component 506 can be disposed to surround an outer perimeter of the second sole component 508. In other words, the first sole component 506 can be disposed to circumscribe the second sole component 508. The first sole component 506 and the second sole component 508 respectively define first and second compliant zones of the sole 500D.

In the configuration of the sole 500B, the first sole component 506 can at least partially support the forefoot, hind foot, midfoot, first lateral, and second lateral regions of an appendage of a robot (e.g., one or both of the first and second appendages 102 and 104 of the robot 100 of FIGS. 1A-1D). As shown, the second sole component 508 can provide at least partial support for a central area of the appendage in a midfoot region.

In such a configuration, the first sole component 506 can absorb impacts to each of the toe, heel, and first and second lateral sides of the appendage, such as those that may be experienced during a gait cycle or other gait-based movements. The first sole component 506 can further provide support to the appendage while the robot is operated to perform one or more gait-associated and/or stance-associated movements and/or operations. The second sole component 508 can provide at least partial support to a midfoot of the appendage to provide support to the robot when the robot is operated to perform one or more gait-associated and/or stance-associated movements or operations. It will be appreciated that materials can be chosen for each sole component and compliant zone in the sole 500B according to the needs and purposes of the sole and/or the robot. Each sole component can comprise a material having the same or different compliances from other sole components.

Figure 5C:
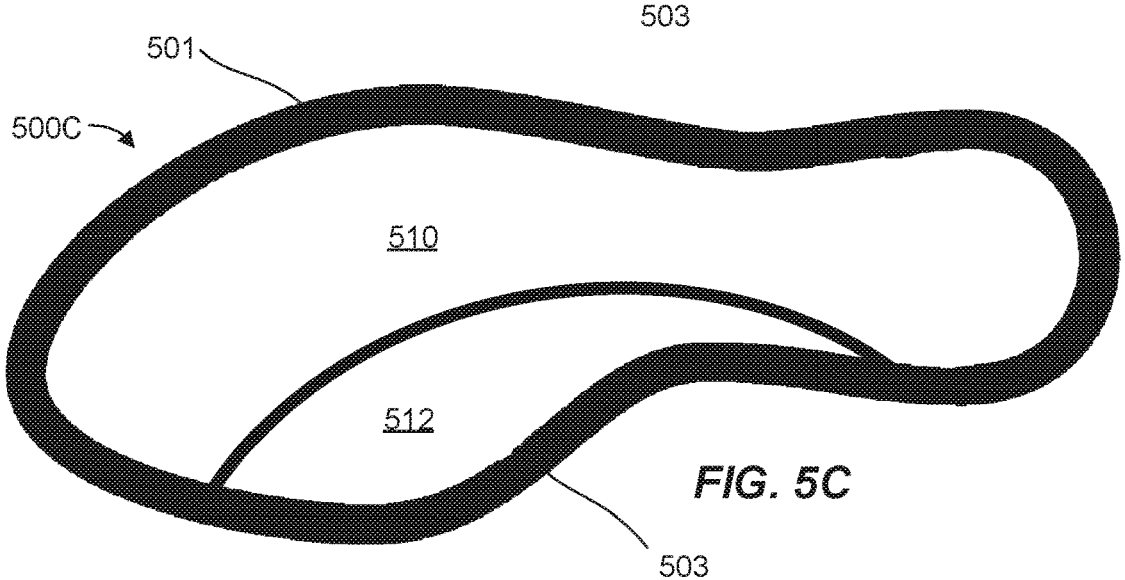

FIG. 5C illustrates a sole 500C for a robot in accordance with an example of the present disclosure. The sole 500C can comprise a first sole component 510 disposed at least partially along a first lateral edge 501 of the sole 500C. The first sole component 510 can be further disposed at both a forefoot, midfoot, and hind foot region of the sole. The sole 500C can further comprise a second sole component 512 disposed at least partially along a second lateral edge of the sole 500C in a second lateral region. The first sole component 510 and the second sole component 512 respectively define first and second compliant zones of the sole 500C.

In the configuration of the sole 500C, the first sole component 510 can at least partially support the forefoot, hind foot, and midfoot regions of an appendage of a robot (e.g., one or both of the first and second appendages 102 and 104 of the robot 100 of FIGS. 1A-1D). As shown, the second sole component 512 can be disposed in a second lateral region of the sole 500C to provide at least partial support for a second lateral area of the appendage of the robot.

In such a configuration, the first sole component 510 can absorb impacts to each of the toe, heel, and first and second lateral sides of the appendage, such as those that may be experienced during a gait cycle or other gait-based movements. The first sole component 510 can further provide support to the appendage while the robot is operated to perform one or more gait-associated and/or stance-associated movements and/or operations. The second sole component 512 can provide at least partial support to a second lateral region of the appendage to provide support to the robot when the robot is operated to perform one or more gait-associated and/or stance-associated movements and/or operations, as well as support to a second lateral region during gait-based movements or operations. It will be appreciated that materials can be chosen for each sole component and compliant zone in the sole 500C according to the needs and purposes of the sole and/or the robot. Each sole component can comprise a material having the same or different compliances from other sole components on the sole 500C.

Figure 5D:
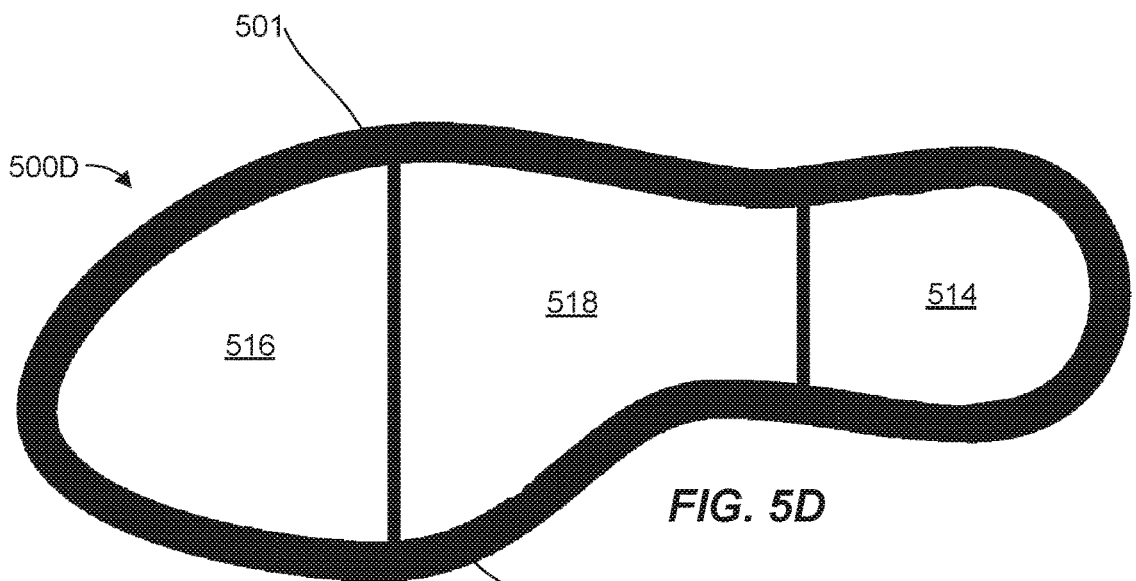

FIG. 5D illustrates a sole 500D for a robot in accordance with an example of the present disclosure. As shown, the sole 500D can include three sole components comprising a first sole component 514, a second sole component 516, and a third sole component 518 respectively defining a first, second, and third compliant zone of the sole 500D.

As shown in FIG. 5D, the first sole component 514 can be disposed at a rearward area of the sole, or in other words, at a heel or hind foot section of the sole 500D. When attached to an appendage of a robot (e.g., one or both of the first and second appendages 102 and 104 of the robot 100 of FIGS. 1A-1D), the first sole component 514 can be at least partially disposed under the hind foot, the midfoot, or both the hind foot and midfoot of the ground-contacting appendage of the robot. As such, during gait-based and/or gait-associated and/or stance-associated movements and/or operations of the robot, the first sole component 514 can provide at least partial support to the hind foot of the ground-contacting appendage of the robot. The first sole component 514 can additionally provide at least partial support to the midfoot of the ground-contacting appendage. The first sole component 514, being located in a hind foot region of the sole 500D, can be configured and positioned to absorb impacts to the heel during operation (e.g., locomotion) of the robot.

As shown in FIG. 5D, the second sole component 516 can be positioned at least partially within a forefoot region 406 and can be partially within a midfoot region 408 of the sole 500D. When attached to an appendage of a robot, the second sole component 516 can be at least partially aligned with and disposed under the forefoot, or the midfoot, or both the forefoot foot and midfoot of a ground-contacting appendage of the robot. As such, during various gait-based, gait-associated and/or stance-associated movements or operations of the robot, the second sole component 516 can provide at least partial support of the forefoot of the ground-contacting appendage of the robot. The second sole component 516 can further provide at least partial support to the midfoot of the ground-contacting appendage or can be disposed to provide at least partial support to the forefoot and midfoot of the appendage. The second sole component 516, being located in a forefoot region of sole 500D, can be configured and positioned to absorb impacts to the toe during operation of the robot.

The third sole component 518 can be positioned at least partially within a midfoot region 408 of the sole 500D. Furthermore, the third sole component 518 can extend into and be partially positioned within the hind foot and the forefoot regions of the sole. When attached to an appendage of a robot, the third sole component 518 can be at least partially aligned with and disposed under the midfoot of a ground-contacting appendage of the robot. As such, during various gait-based, gait-associated and/or stance-associated movements or operations of the robot, the third sole component 518 can provide at least partial support to the midfoot of the ground-contacting appendage of the robot. The third sole component 518 can further provide at least partial support to the forefoot and/or hind foot of the ground-contacting appendage. It will be appreciated that materials can be chosen for each sole component and compliant zone in the sole 500D according to the needs and purposes of the sole and/or the robot. Each sole component can comprise a material having the same or different compliances from other sole components.

Figure 5E:
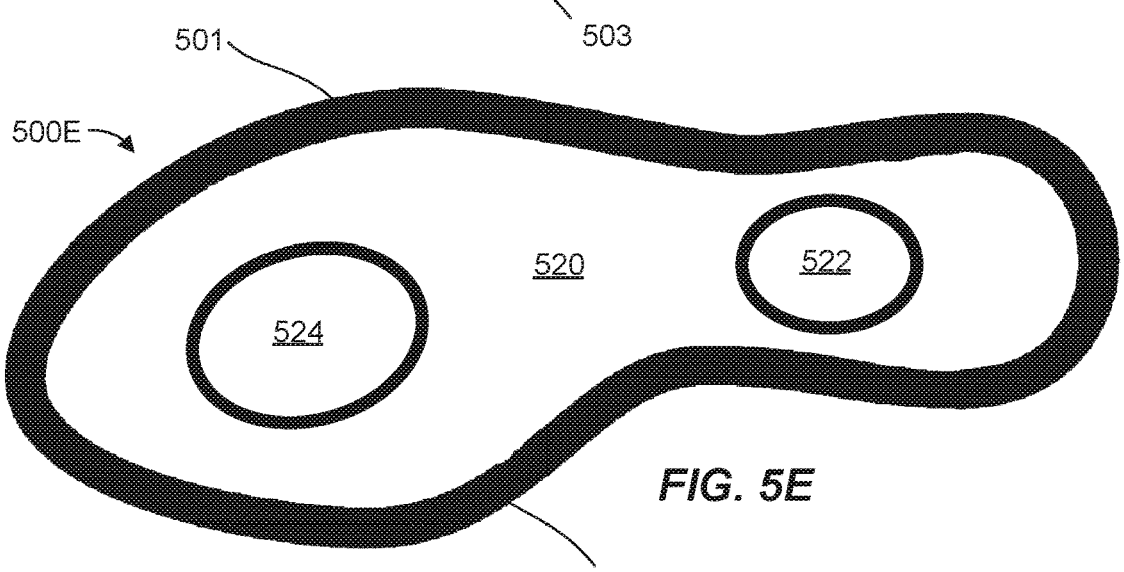

FIG. 5E illustrates a sole 500E for a robot in accordance with an example of the present disclosure. As shown, the sole 500E can include three sole components comprising a first sole component 520, a second sole component 522, and a third sole component 524 respectively defining a first, second, and third compliant zone of the sole 500E.

As shown in FIG. 5E, the first sole component 520 can be disposed around an outer perimeter of the sole 500E, substantially located within forefoot, midfoot, hind foot, first lateral, and second lateral regions of the sole 500E. The sole 500E can comprise a second sole component 522 disposed substantially in a midfoot region and/or hind foot region of the sole. The sole 500E can further comprise a third sole component 524 disposed substantially in a midfoot region and/or forefoot region of the sole. The first sole component 520 can be disposed to surround an outer perimeter of the second sole component 522 and the third sole component 524. In other words, the first sole component 520 can be disposed to circumscribe the second sole component 522 and the third sole component 524.

In the configuration of the sole 500E, the first sole component 520 can at least partially support the forefoot, hind foot, midfoot, first lateral, and second lateral regions of an appendage of a robot (e.g., one or both of the first and second appendages 102 and 104 of the robot 100 of FIGS. 1A-1D). In such a configuration, the first sole component 520 can absorb impacts to each of the toe, heel, and first and second lateral sides of the appendage, such as those that may be experienced during a gait cycle or other gait-based movements or operations. The first sole component 520 can further provide support to a midfoot region of the appendage when the robot is operated to perform one or more gait-associated and/or stance-associated movements or operations.

The second sole component 522 and the third sole component 524 can provide at least partial support for central areas of the appendage in any of the forefoot region, midfoot region, and/or hind foot region. For example, the second sole component 522 can provide at least partial support to midfoot regions of the appendage and can further provide support to forefoot and hind foot regions to provide support to the robot when the robot is operated to perform one or more gait-associated and/or stance-associated movements and/or operations.

The locations of the second sole component 522 and the third sole component 524 are not limited by what is shown in FIG. 5E and each of the second and third sole components 522 and 524 can be positioned anywhere on the sole 500E, at positions circumscribed by the first sole component 520, to facilitate desired goals and purposes of the sole 500E. It will be appreciated that materials can be chosen for each sole component and compliant zone in the sole 500E according to the needs and purposes of the sole and/or the robot. Each sole component can comprise a material having the same or different compliances from other sole components.

Figure 5F:
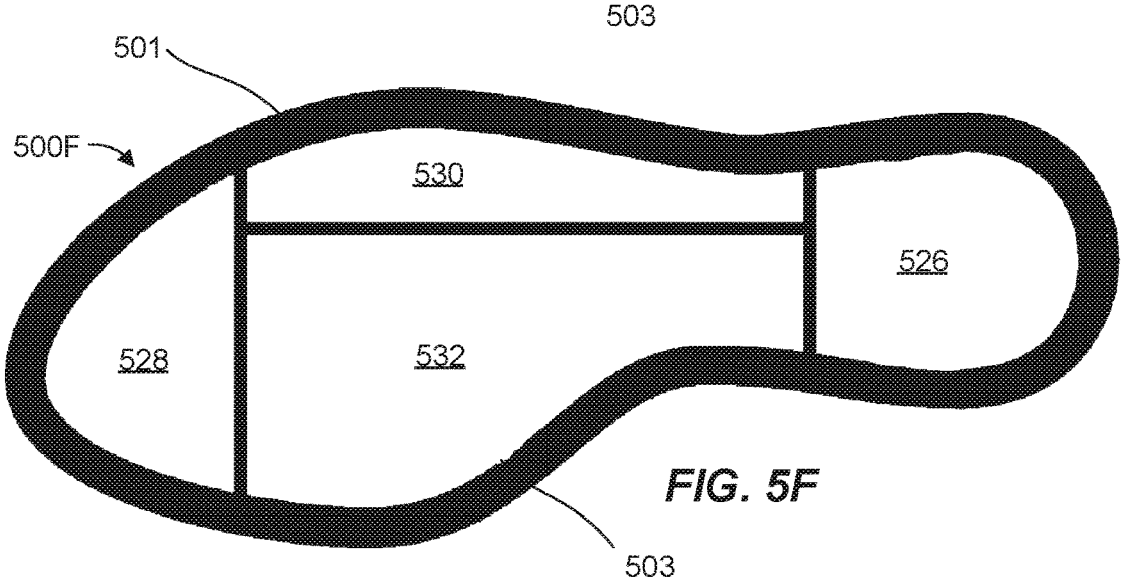

FIG. 5F illustrates a sole 500F for a robot in accordance with an example of the present disclosure. As shown, the sole 500F can include four sole components comprising a first sole component 526, a second sole component 528, a third sole component 530, and a fourth sole component 532, respectively defining first, second, third, and fourth compliant zones of sole 500F.

As shown in FIG. 5F, the first sole component 526 can be disposed at a rearward area of the sole, or in other words, at a heel or hind foot section of the sole 500F. When attached to an appendage of a robot (e.g., one or both of the first and second appendages 102 and 104 of the robot 100 of FIGS. 1A-1D), the first sole component 526 can be at least partially aligned with and disposed under the hind foot, the midfoot, or both the hind foot and midfoot of a ground-contacting appendage of the robot. As such, during gait-based, gait-associated and/or stance-associated movements and/or operations of the robot, the first sole component 526 can provide at least partial support to the hind foot of the ground-contacting appendage of the robot. The first sole component 526 can additionally provide at least partial support to the midfoot of the ground-contacting appendage. The first sole component 526, being located in a hind foot region of the sole 500F, can be configured and positioned to absorb impacts to the heel during operation (e.g., locomotion) of the robot.

As shown in FIG. 5F, the second sole component 528 can be positioned at least partially within a forefoot region and can be partially within a midfoot region of a sole. When attached to an appendage of a robot, the second sole component 528 can be at least partially aligned with and disposed under the forefoot, or the midfoot, or both the forefoot and midfoot of a ground-contacting appendage of the robot. As such, during gait-based, gait-associated and/or stance-associated movements and/or operations of the robot, the second sole component 528 can provide at least partial support of the forefoot of the ground-contacting appendage of the robot. The second sole component can further provide at least partial support to the midfoot of the ground-contacting appendage or can be disposed to provide at least partial support to the forefoot and midfoot of the appendage. The second sole component 528, being located in a forefoot region of the sole 500F, can be configured and positioned to absorb impacts to the toe during operation (e.g., locomotion) of the robot.

The third sole component 530 can be positioned at least partially within a first lateral region of the sole. The third sole component 530 can extend into and be partially positioned within the hind foot, the forefoot, and/or the midfoot regions of the sole. When attached to an appendage of a robot, the third sole component 530 can be at least partially aligned with and disposed under the first lateral region of a ground-contacting appendage of the robot. As such, during gait-based, gait-associated and/or stance-associated movements and/or operations of the robot, the third sole component 530 can provide at least partial support to the midfoot on the first lateral side of the ground-contacting appendage of the robot. The third sole component 530 can further provide at least partial support to the forefoot and/or hind foot of the ground-contacting appendage. The third sole component 530, being located in a first lateral region of the sole 500F, can be configured and positioned to absorb impacts to the first lateral region during operation (e.g., locomotion) of the robot.

The fourth sole component 532 can be positioned at least partially within a midfoot region 40 of a sole. Furthermore, the fourth sole component 532 can extend into and be partially positioned within the hind foot and the forefoot regions of the sole. When attached to an appendage of a robot, the fourth sole component 532 can be at least partially aligned with and disposed under the midfoot of a ground-contacting appendage of the robot. As such, during gait-based, gait-associated and/or stance-associated movements and/or operations of the robot, the fourth sole component 532 can provide at least partial support to the midfoot of the ground-contacting appendage of the robot. The fourth sole component 532 can further provide at least partial support to the forefoot and/or hind foot of the ground-contacting appendage. The fourth sole component 532, being located in a midfoot region of the sole 500F, can be configured and positioned to absorb impacts to provide at least partial support to the midfoot of the robot during operation of the robot (e.g., locomotion and standing still).

It will be appreciated that materials can be chosen for each sole component and compliant zone in the sole 500F according to the needs and purposes of the sole. Each sole component can comprise a material having the same or different compliances from other sole components.

Figure 5G:
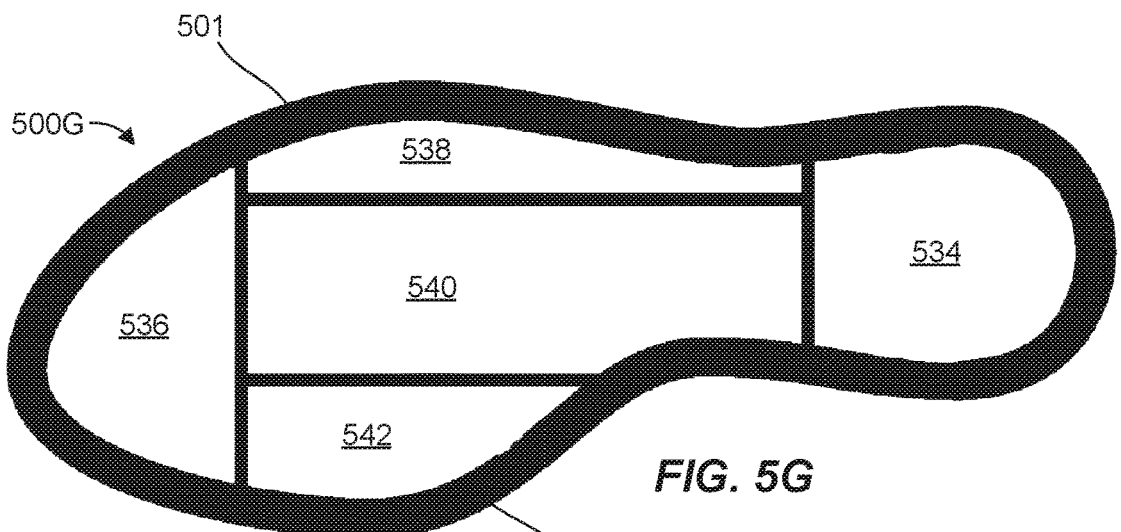

FIG. 5G illustrates a sole 500G for a robot in accordance with an example of the present disclosure. Similar to as described in regard to the sole 500F of FIG. 5F, the sole 500G can include a first sole component 534, a second sole component 536, a third sole component 538, and a fourth sole component 540, respectively defining first, second, third, and fourth compliant zones of sole 500F. Additionally, the sole 500F can include a fifth sole component 542 defining a fifth compliant zone of the sole 500F. The configuration, function and location of the first sole component 534, the second sole component 536, the third sole component 538, and the fourth sole component 540 of the sole 500G can be similar to the configuration, function and location of the first sole component 526, the second sole component 528, the third sole component 530, and the fourth sole component 532, respectively, of the sole 500F of FIG. 5F.

The fifth sole component 542 can be positioned at least partially within a first lateral region of a sole. The fifth sole component 542 can extend into and be partially positioned within the forefoot, and/or the midfoot regions of the sole 500F. When attached to an appendage of a robot (e.g., one or both of the first and second appendages 102 and 104 of the robot 100 of FIGS. 1A-1D), the fifth sole component 542 can be at least partially aligned with and disposed under the second lateral region of a ground-contacting appendage of the robot. As such, during gait-based, gait-associated and/or stance-associated movements and/or operations of the robot, the fifth sole component 542 can provide at least partial support to the midfoot on the second lateral side of the ground-contacting appendage of the robot. The fifth sole component 542 can further provide at least partial support to the forefoot and/or hind foot of the ground-contacting appendage. The fifth sole component 542, being located in a second lateral region of the sole 500G, can be configured and positioned to absorb impacts to the second lateral region during operation (e.g., locomotion) of the robot.

It will be appreciated that materials can be chosen for each sole component and compliant zone in the sole 500G according to the needs and purposes of the sole. Each sole component can comprise a material having the same or different compliances from other sole components.

Figure 5H:
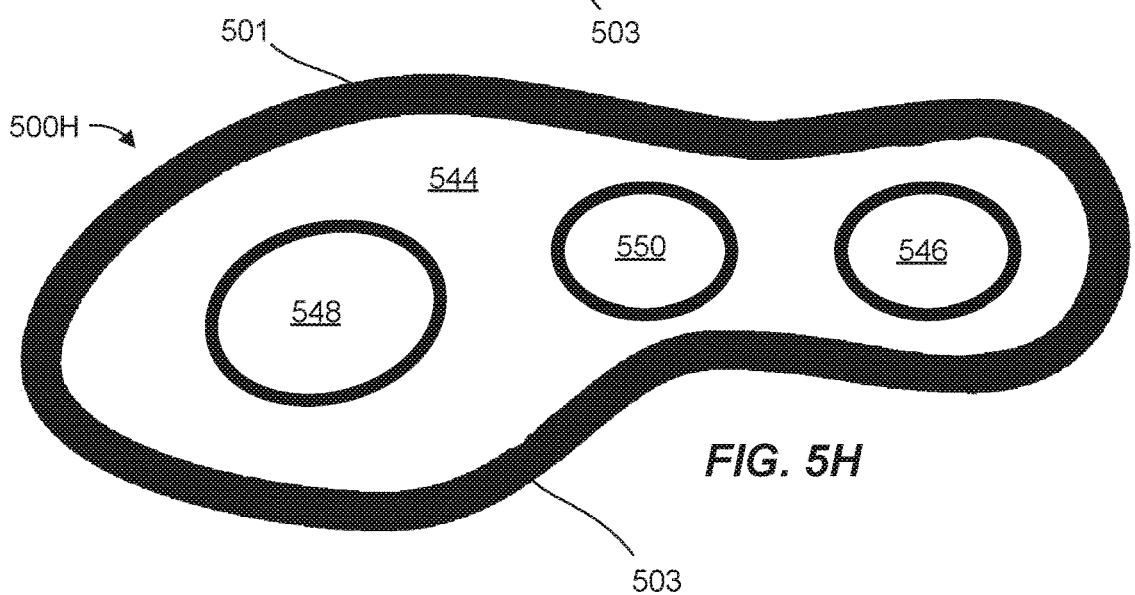

FIG. 5H illustrates a sole 500H for a robot in accordance with an example of the present disclosure. As shown, the sole 500H can include four sole components comprising a first sole component 544, a second sole component 546, a third sole component 548, and a fourth sole component 550 respectively defining first, second, third, and fourth compliant zones of sole 500H. As shown in FIG. 5H, the first sole component 544 can be disposed around an outer perimeter of the sole 500h, substantially located within the forefoot, midfoot, hind foot, first and second lateral regions of the sole. The sole 500H can comprise a second sole component 546 disposed substantially in a midfoot region and/or hind foot region of the sole. The sole 500H can further comprise a third sole component 548 disposed substantially in a midfoot region and/or forefoot region of the sole. The sole 500H can further comprise a fourth sole component 550 disposed substantially in a midfoot region of the sole. The first sole component 544 can be disposed to surround an outer perimeter of the second sole component 546, the third sole component 548, and the fourth sole component 550. In other words, the first sole component 544 can be disposed to circumscribe the second sole component 546, the third sole component 548, and the fourth sole component 550.

In the configuration of the sole 500H, the first sole component 544 can at least partially support the forefoot, hind foot, midfoot, first lateral, and second lateral regions of an appendage on a robot (e.g., one or both of the first and second appendages 102 and 104 of the robot 100 of FIGS. 1A-1D). In such a configuration, the first sole component 544 can absorb impacts to each of the toe, heel, and first and second lateral sides of the appendage, such as those that may be experienced during a gait cycle or other gait-based movements and/or operations. The first sole component 544 can further provide support to a midfoot region of the appendage while the robot is operated to perform one or more gait-associated and/or stance-associated movements and/or operations (e.g., standing still).

The second sole component 546, the third sole component 548, and the fourth sole component 550 can provide at least partial support for central areas of the appendage in any of the forefoot region, midfoot region, and/or hind foot region. For example, the second sole component 546 can provide at least partial support to midfoot regions of the appendage and can further provide support to forefoot and hind foot regions to provide support to the robot when the robot is operated to perform one or more gait-associated and/or stance-associated movements or operations (e.g., a standing operation).

The locations of the second sole component 546, the third sole component 548, and the fourth sole component 550 are not intended to be limited to what is shown in FIG. 5H, and each of the second, third, and fourth sole components can be positioned anywhere on the sole 500H, at positions circumscribed by the first sole component 544, to facilitate desired goals and purposes of the sole 500H. It will be appreciated that materials can be chosen for each sole component and compliant zone in the sole 500H according to the needs and purposes of the sole 500H and/or the robot. Each sole component can comprise a material having the same or different compliances from other sole components within the sole 500H.

Figure 5I:
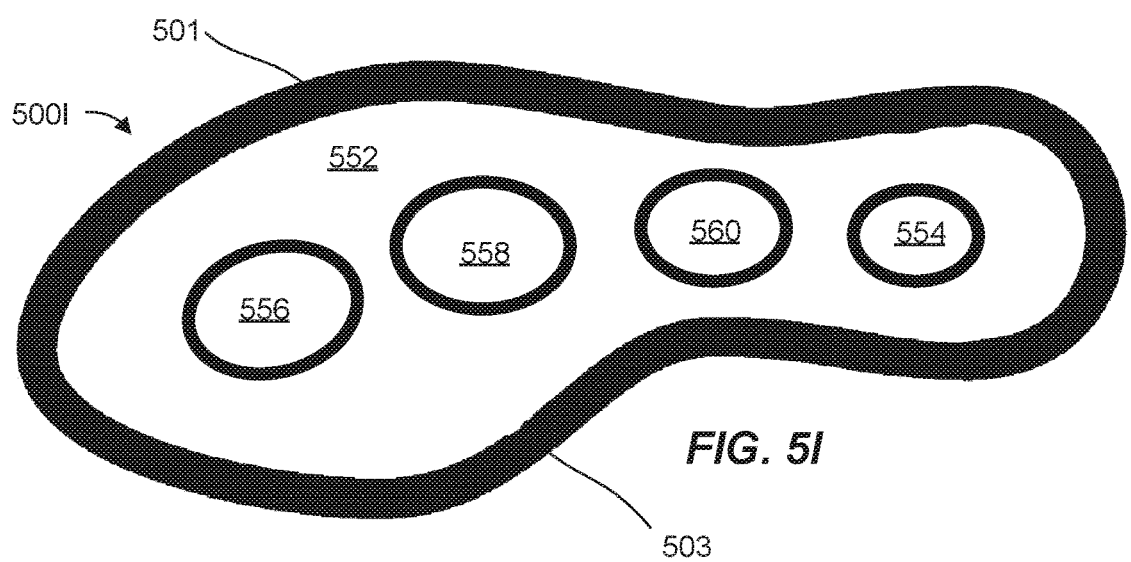

Soles in accordance with examples of the present disclosure can comprise any number of a plurality of sole components circumscribed by a first sole component. For example, FIG. 5I illustrates a sole 500I for a robot in accordance with an example of the present disclosure. As shown, sole 500I can include four sole components comprising a first sole component 552, and second, third, fourth, and fifth sole components 552, 554, 556, 558, and 560, respectively defining first, second, third, fourth, and fifth compliant zones of sole 500I.

Any number of sole components can be included in a sole as being circumscribed by a one or more other sole components, such as the first sole component 552, and soles are not limited to what is shown in FIG. 5I. As shown in FIG. 5I, the first sole component 552 can be disposed around an outer perimeter of the sole 500I, substantially located within forefoot, midfoot, hind foot, first lateral, and second lateral regions of the sole. Further, sole components of any number can be included in the sole 500I at positions circumscribed by the first sole component 552, and can each be disposed to support one or more of forefoot, midfoot, hind foot, first lateral, and second lateral regions of the sole 500I.

In the configuration of the sole 500I, the first sole component 552 can at least partially support forefoot, hind foot, midfoot, first lateral, and second lateral regions of an appendage of a robot (e.g., one or both of the first and second appendages 102 and 104 of the robot 100 of FIGS. 1A-1D). In such a configuration, the first sole component 552 can absorb impacts to each of the toe, heel, and first and second lateral sides of the appendage, such as those that may be experienced during a gait cycle or other gait-based movements and/or operations. The first sole component 552 can further provide support to a midfoot region of the appendage while the robot is operated to perform one or more gait-associated and/or stance-associated movements or operations (e.g., standing still).

Each of the plurality of additional sole components (e.g., the sole components 554-560) can provide at least partial support for central areas of the appendage in any of the forefoot region, midfoot region, and/or hind foot region to provide support for the robot during operation (e.g., locomotion, standing still, or any other movements or operations). The locations of additional sole components (e.g., the sole components 554-560) are not limited what is shown in FIG. 5I, and each of the second, third, and fourth sole components can be positioned anywhere on the sole 500I, at positions circumscribed by the first sole component 552, to facilitate desired goals and purposes of the sole 500I and/or the robot. It will be appreciated that materials can be chosen for each sole component and compliant zone in the sole 500I according to the needs and purposes of the sole 500I and/or the robot. Each sole component can comprise a material having the same or different compliances from other sole components.

Figure 5J:
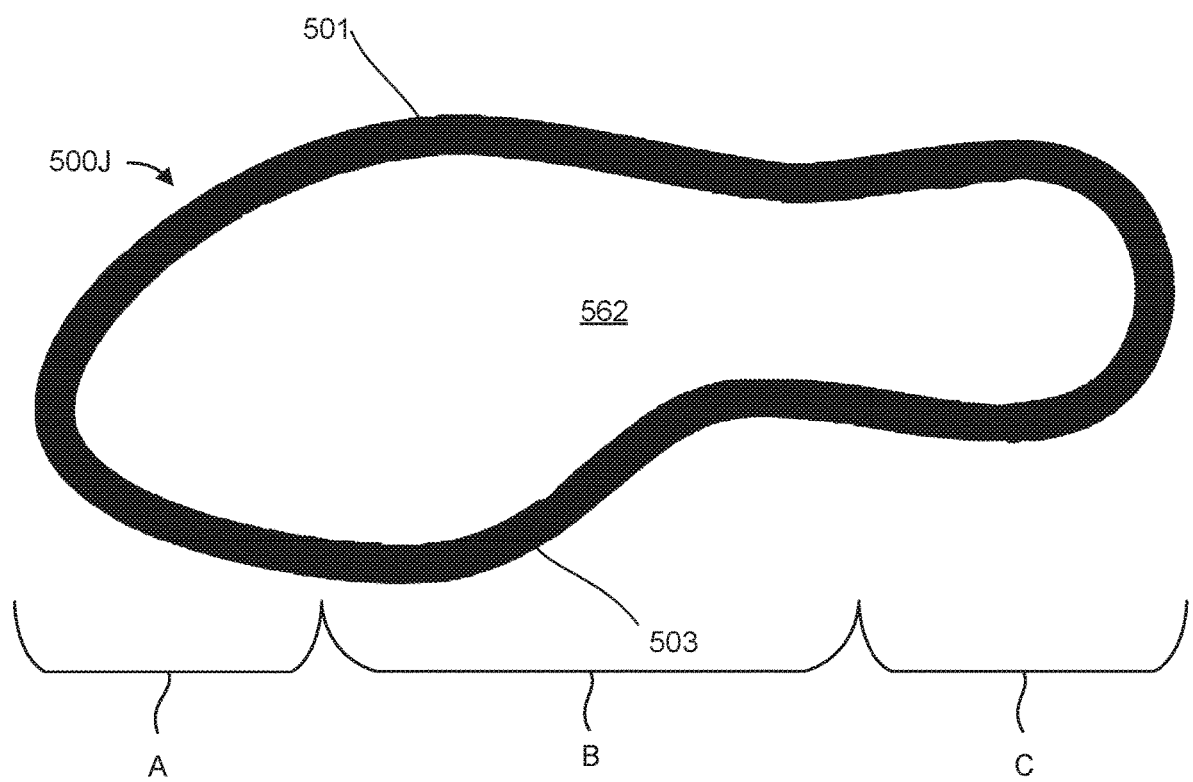

Additionally, a sole may be manufactured having a single sole component instead of multiple sole components. In order to achieve different compliance zones in the sole with only one sole component, the sole component may be engineered and made of a single material that is processed or produced to vary in compliance throughout the material. For example, FIG. 5J illustrates a sole 500J including a single sole component 562. The sole component 562 can be made of a single material (e.g., composite material or isotropic material) throughout the entire sole component 562. However, in order to vary compliance of the material, the material may be subject to different manufacturing, processing, tempering, compression, or any other known processes in order to change or vary the material properties of the material in different zones. Additionally, ratios of components that make up a composite material of the sole component 562 may be varied in different regions in order to achieve desired compliance for each region of the sole component 562. For example, sole component 562 may be made of a single material. However, one or more of zones A, B, or C of the sole component 562 can be subject to different focused processes in order to change the compliance, stiffness, or mechanical impedance of that zone to vary with respect to other zones. For example, zones A and C may be more compliant than zone B in order to cushion impulses on the heel and toe portions of the sole 500J. Accordingly, a compliant sole made of a single material in a single sole component, but having different zones of different compliance, is contemplated and covered by this disclosure.

Figure 5K:
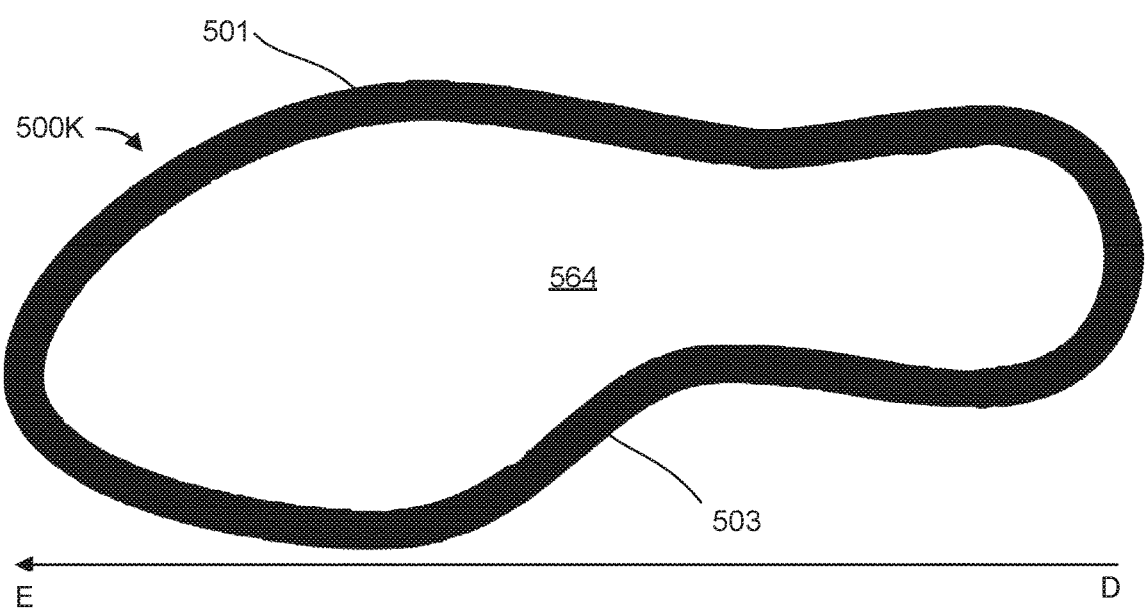

FIG. 5K illustrates another configuration of a sole 500K wherein the compliance of the sole 500K can vary linearly with respect to a direction along the sole 500K. For example, as the sole component 564 extends from point D at the heel of the sole component 564 to point E, at the toe of the sole component 564, the sole component 564 can become more or less compliant depending on the desires and purposes for the sole 500K. It will be appreciated by those of skill in the art that the single sole components 562 and 564 of FIGS. 5J and 5K, respectively, can be engineered and manufactured to have any number and configuration of compliance zones (e.g., toe, heel, mid foot, first lateral, second lateral, side, oblique, angled, curved) and to have any variability of compliance (e.g., side to side, front to back, angled, circular, rings extending radially outward, or any other configuration) throughout the sole components 562 and 564. The illustrated configurations of FIGS. 5J and 5K are not intended to limit the disclosure in any way.

Each sole described herein can be configured to be attached to a ground-contacting appendage of a robot. Any sole in accordance with examples of the present disclosure can be in a shape of a human foot as shown in FIGS. 4-5K. Alternatively, these soles can be configured to comprise any size, shape, and/or configuration to support an appendage of a robot. The soles can be a similar shape as the appendage or they can be of a different shape then the appendage.

Figure 6A:
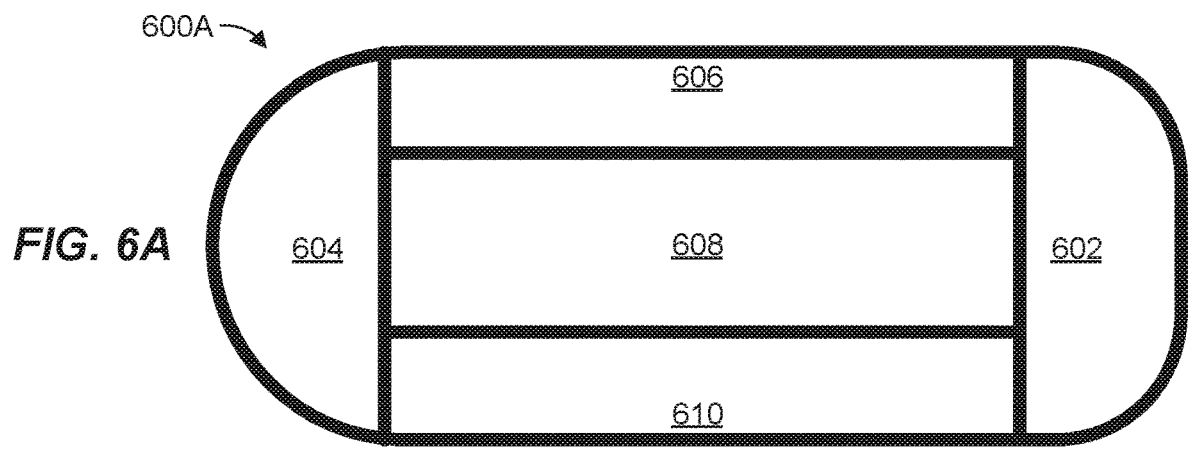
FIGS. 6A-6C illustrate alternative shapes of graphical example soles for a robot, such as the robot of FIG. 1A, in accordance with examples of the present disclosure.
Figure 6B:
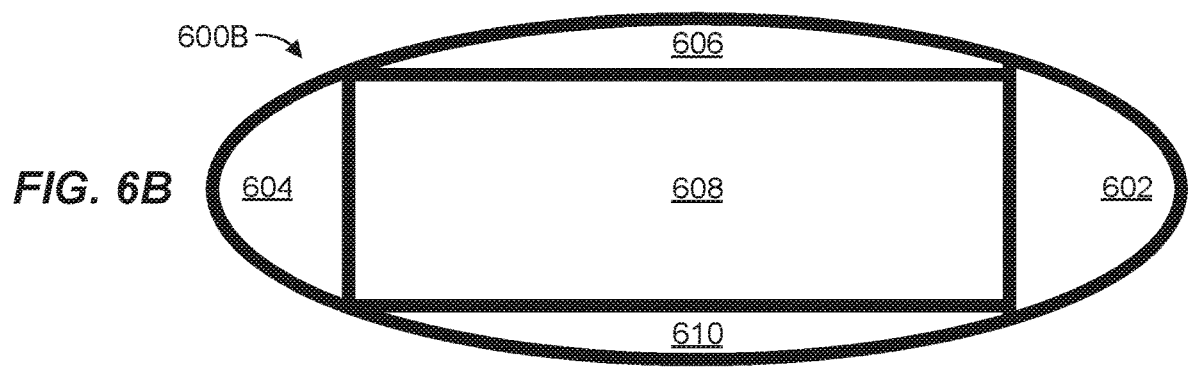
Figure 6C:
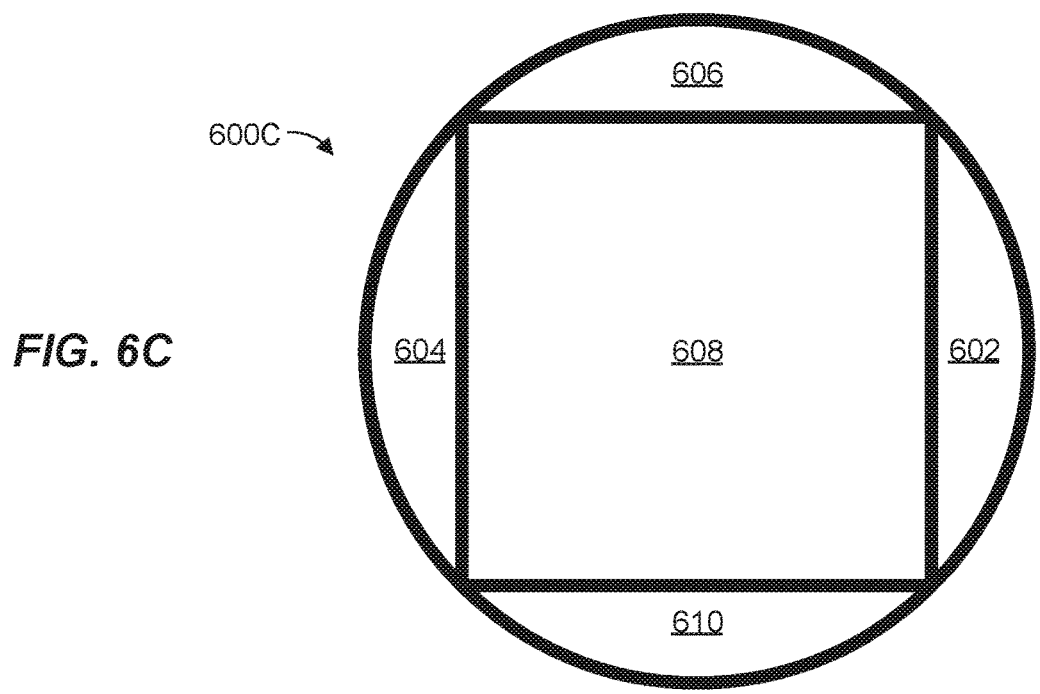

As examples, FIGS. 6A-6C illustrate alternative shapes of possible soles that can be attached to an appendage of a robot. FIG. 6A illustrates an elongated, rectangular shaped sole 600A. FIG. 6B illustrates an elongated, ellipse shaped sole 600B. FIG. 6C illustrates a circular shaped sole 600A. Each of the soles 600A, 600B, and 600C can include a first sole component 602 at a heel end of the sole, a second sole component 604 disposed at a toe end of the sole, a third sole component 606 disposed at a first lateral edge of the sole, a fourth sole component 608 disposed at a center edge of the sole, and a fifth sole component 610 disposed at a second lateral edge of the sole. As described above, each sole component can define a compliant zone and each compliant can have a different or same compliance and be made of a different or same material.

Soles described herein can be disposed on a ground-contacting appendage of a robot. It is to be understood that the term "ground-contacting appendage" is defined to include both direct and indirect contact between the ground-contacting appendage and a locomotion surface. A ground-contacting appendage need not be in direct physical contact with ground in order to be considered ground contacting. The appendage can directly contact the ground, or can indirectly contact the ground via a pad, shield, or sole (e.g., examples according to the present disclosure) disposed on the ground-contacting appendage.

It is to be understood that the sole components can be disposed on the ground-contacting appendage of the robot in a variety of ways. For example, sole components can be integrally formed with the appendage. In another example, the sole components can be individually removably coupled to the appendage via one or more fasteners such as screws, bolts, spring clips, magnets, threaded rods, hook and loop fasteners such as Velcro or others, or the sole components can be coupled to the appendage via an adhesive. Alternatively, individual sole components can be supported by a structural frame that makes up part of the sole, and the frame can comprise the robot interface operable to facilitate attachment of the sole to the appendage of the robot via one or more fasteners, screws, bolts, spring clips, magnets, threaded rods, hook and loop fasteners, or others, or via an adhesive. Therefore, the sole and sole components can be fixedly attached to the appendage or they can be removable and replaceable from the appendage to facilitate repair and replacement of worn sole components.

Figure 7A:
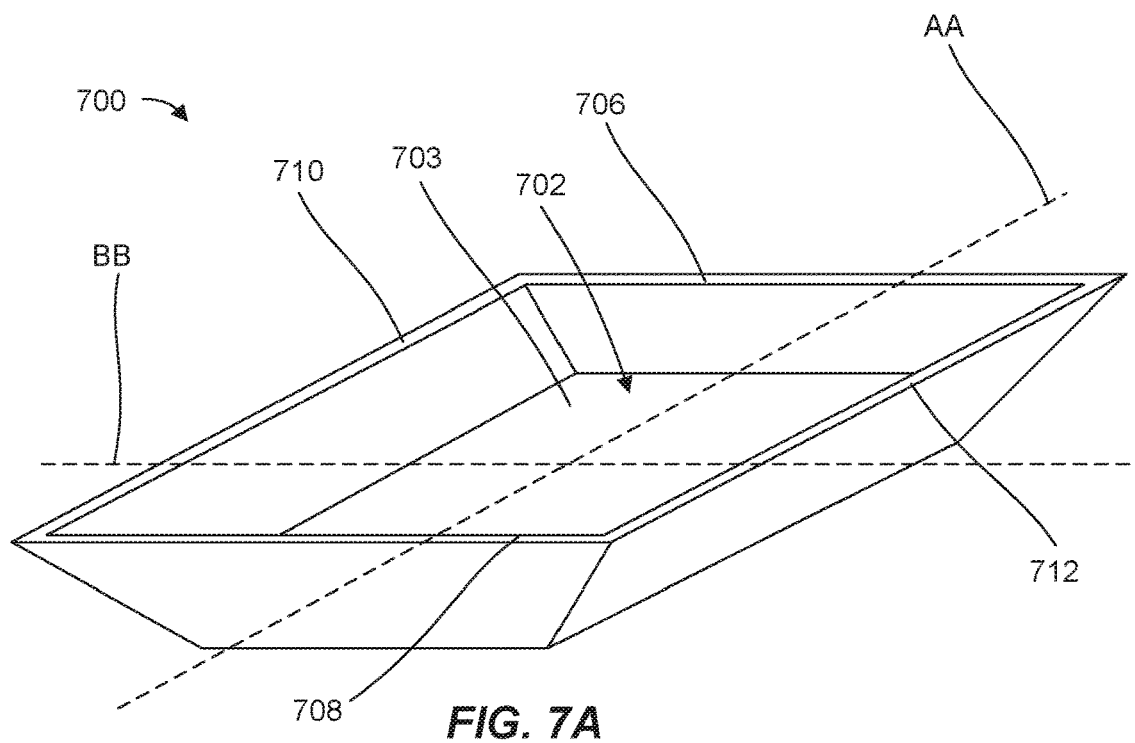
FIG. 7A illustrates an isometric view of an exemplary frame that receives and supports one or more sole components in accordance with an example of the present disclosure.
Figure 7B:
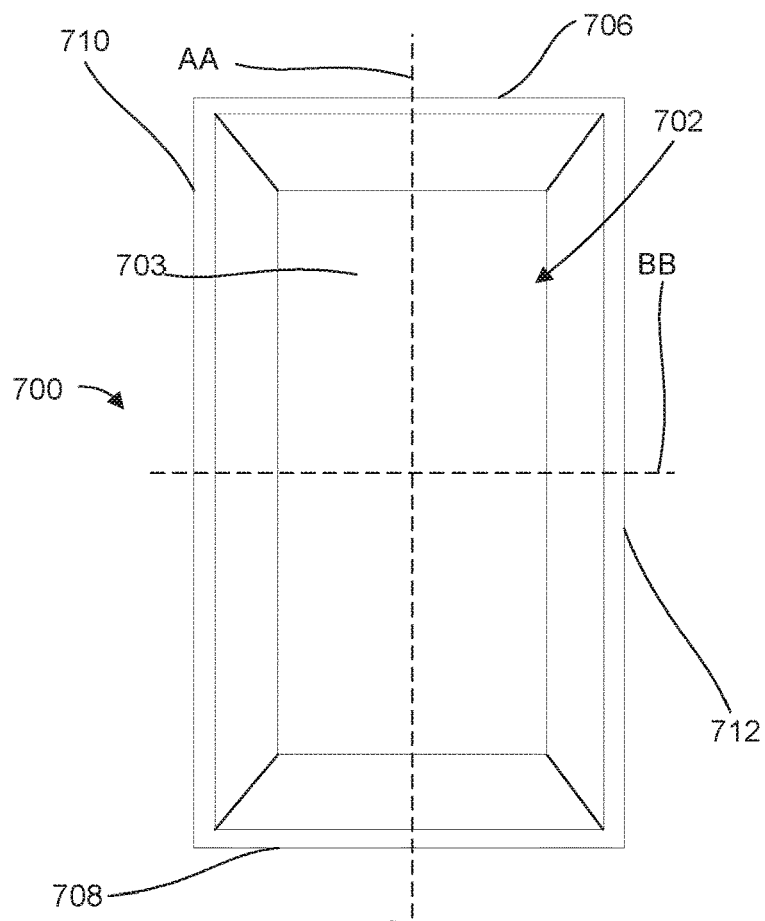
FIG. 7B illustrates a top view of the exemplary frame of FIG. 7A.

Any of the soles discussed herein can further comprise a frame or other rigid or semi-rigid (i.e., non-deformable) structural component in support of one or more compliant sole components, the frame comprising the robot interface operable to facilitate attachment of the sole to the appendage of the robot. In other words, it is contemplated that the sole components discussed herein can be supported on a frame as part of the sole configuration. FIG. 7A illustrates an isometric view of an exemplary frame 700 that can receive and support thereon one or more sole components in accordance with an example of the present disclosure. The frame 700 can comprise a robot interface operable to be attached to, or to facilitate attachment of the sole to, an appendage of a robot (e.g., one or both of the first and second appendages 102 and 104 of the robot 100 of FIGS. 1A-1D). FIG. 7B illustrates a top view of the exemplary frame 700 of FIG. 7A. It is to be understood that the structural frame 700 shown in FIGS. 7A and 7B is merely an example of one type or configuration of a frame of a sole, and is not intended to be limiting in any way as frames of any size, shape and configuration are contemplated herein. In the example shown, the frame 700 comprises a rectangular shape for ease of illustration. Indeed, a frame attached to an appendage of a robot can have any shape, such as a shape of a human foot, circular, square, rectangular, elliptical, or any other shape suitable for use with an appendage of a robot. In FIGS. 7A and 7B, the sole components are omitted from the frame.

The frame 700 can comprise a robot interface, or one or more robot interfacing surfaces, operable to be connected to the ground-contacting appendage of the robot. The frame 700 can support one or more sole components thereon, which sole components contact the ground during operation of the robot and provide support to various areas of the appendage, as described herein. The frame 700 can comprise a base 702 comprising a robot interface surface 703, which interfaces with the appendage of the robot (and which in some examples can facilitate attachment of the sole to the appendage). The base 702 can further comprise a lower surface 704 which can receive sole components. The lower surface 704 can, in some examples, comprise one or more ground contacting portions configured to be in contact with the ground or surface. The lower surface 704 can further be configured to be in support of one or more sole components (e.g., the sole component 608 of the sole 600A of FIG. 6A, or any others discussed herein).

The frame 700 can further comprise one or more sole component stabilizers that are supported by the base 702 and that are formed at an angle with respect to the base 702. The sole component stabilizers can be configured to back (i.e., provide a backing for) one or more of the sole components disposed and supported on the frame 700, as will be described more fully below. In the example shown, the frame 700 can comprise a front stabilizer 706, a rear stabilizer 708, a first lateral stabilizer 710, and a second lateral stabilizer 712, each extending from and supported by the base 702. Each of the sole component stabilizers 706, 708, 710, and 712 can at least partially receive and be in at least partial support of a sole component (e.g., the sole components 604, 602, 606, and/or 610, or any others as described herein) on a surface of the stabilizer, and can be configured to provide a supportive backing to the sole components to facilitate stable gait-based, gait-associated and/or stance-associated movements and/or operations of the robot during operation. Additionally, as shown in FIG. 7, each sole component stabilizer 706, 708, 710, and 712 can be a plate-like member, or in other words, be configured to comprise a plate-like configuration. The plate-like configuration of each sole component stabilizer will be described in more detail with reference to FIGS. 9A, 9B and 10B.

Figure 8A:
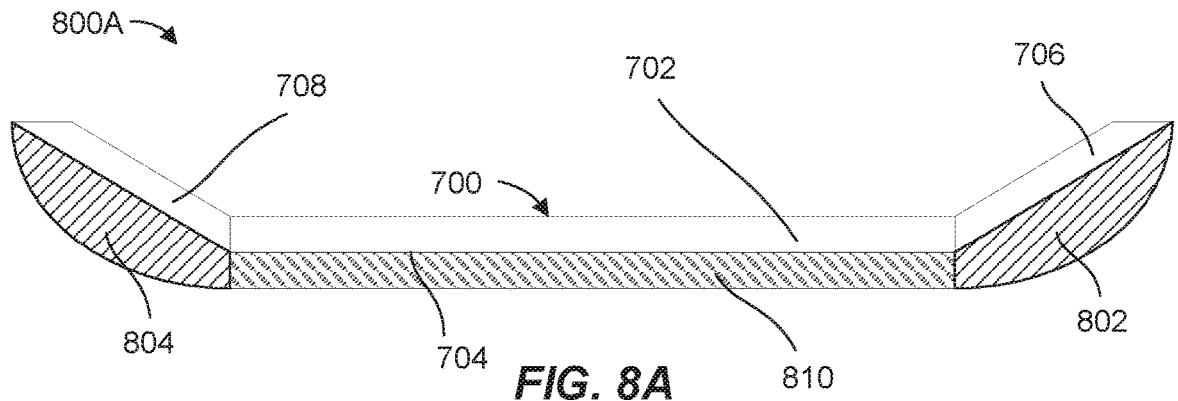
FIG. 8A illustrates a cross-sectional view of the exemplary frame of FIGS. 7A and 7B that receives and supports one or more sole components to form a sole operable with a robot in accordance with an example of the present disclosure.
Figure 8B:
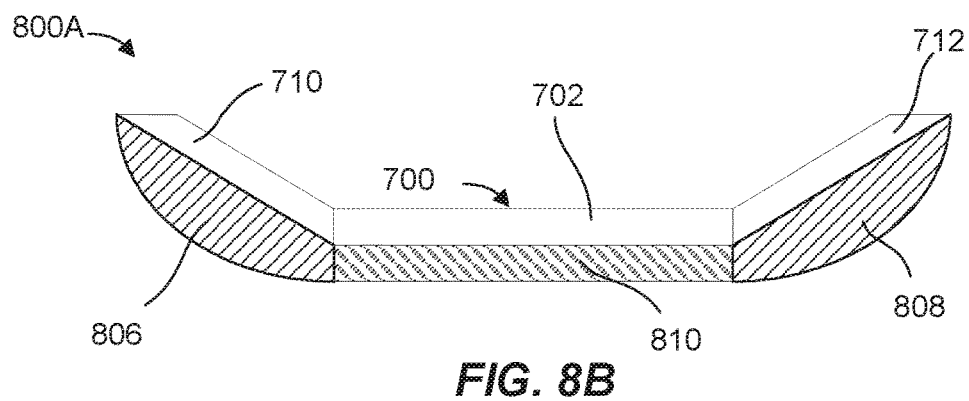
FIG. 8B illustrates a cross-sectional view of the exemplary sole of FIG. 8A.

FIG. 8A illustrates a cross-sectional view of the frame 700 taken along line AA of FIGS. 7a and 7B, with various sole components disposed and supported thereon to form a compliant sole 800 operable with a gait-based robot, such as the gait-based robot 100 of FIGS. 1A-1D. FIG. 8B illustrates a cross-sectional view of the sole of FIG. 8A, with the frame 700 taken along line BB of FIGS. 7A and 7B, and with the various sole components disposed and supported thereon. As shown, the frame 700 can receive and support a first sole component 802 on or about the front stabilizer 706. The frame 700 can further receive and support a second sole component 804 on or about the rear stabilizer 708. Frame 700 can further receive and support a third sole component 806 on or about the first lateral stabilizer 710, and can further receive and support a fourth sole component 808 on or about the second lateral stabilizer 712. Additionally, as shown in FIG. 8A, the lower surface 704 of the frame 700 can receive and support a fifth sole component 810 thereon. As shown, each of the stabilizers can be supported by the base 702 and can be disposed at an angle with respect to the base 702.

Figure 8C:
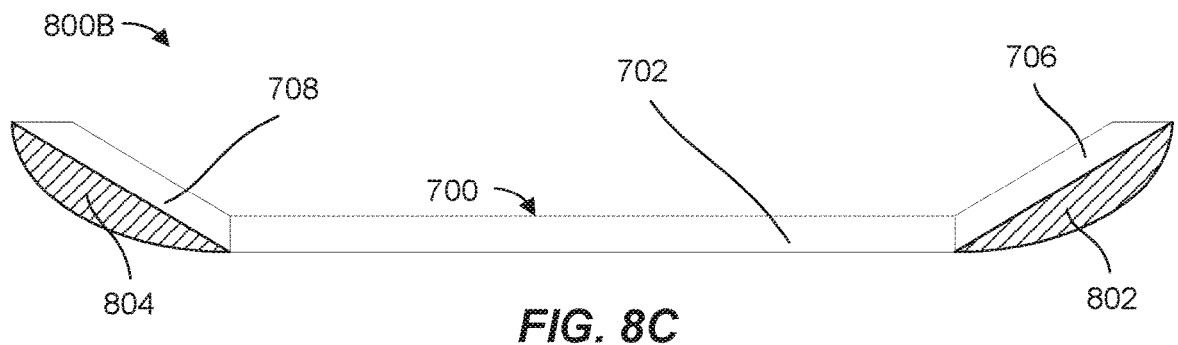
FIG. 8C illustrates a cross-sectional view of the exemplary sole of FIG. 8A having some of the sole components supported on the frame of FIGS. 7a and 7B, in accordance with an example of the present disclosure.
Figure 8D:
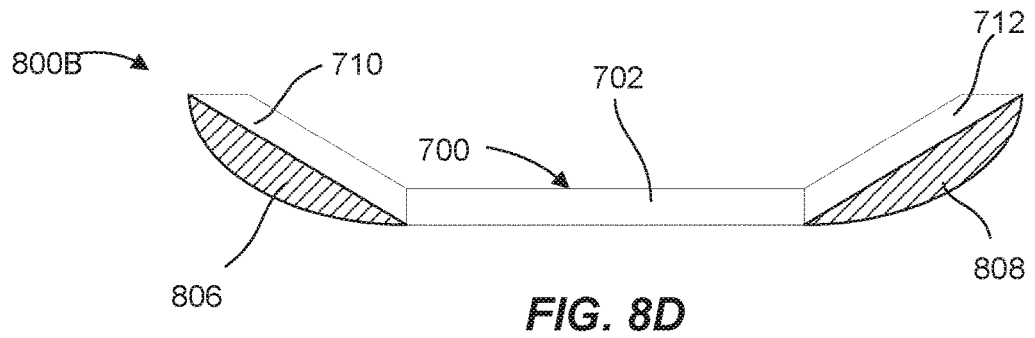
FIG. 8D illustrates a cross-sectional view of the exemplary sole of FIG. 8C.

FIG. 8C illustrates a cross-sectional view of a variation of a sole 800B, with the frame 700 taken along line AA of FIGS. 7A and 7B, and with some of the same sole components disposed thereon. FIG. 8D illustrates a cross-sectional view of sole 800B of FIG. 8C, with the frame 700 taken along line BB, and with some of the sole components disposed thereon. As shown, the frame 700 can receive and support a first sole component 802 on the front stabilizer 706. The frame 700 can further receive and support a second sole component 804 on the rear stabilizer 708. The frame 700 can further receive and support a third sole component 806 on the first lateral stabilizer 710 and can further receive and support a fourth sole component on the second lateral stabilizer 712. In contrast to the example sole shown in FIGS. 8A and 8B, the example sole of FIGS. 8C and 8D comprises the lower surface 704 of the frame 700 without a sole component thereon. Instead, the lower surface 704 acts as a rigid, non-compliant ground contacting surface surrounded on the periphery with compliant sole components disposed on and supported by the stabilizers. Accordingly, the frame 700 itself can contact the locomotion surface, or can receive a sole component that contacts the locomotion surface.

Figure 8E:
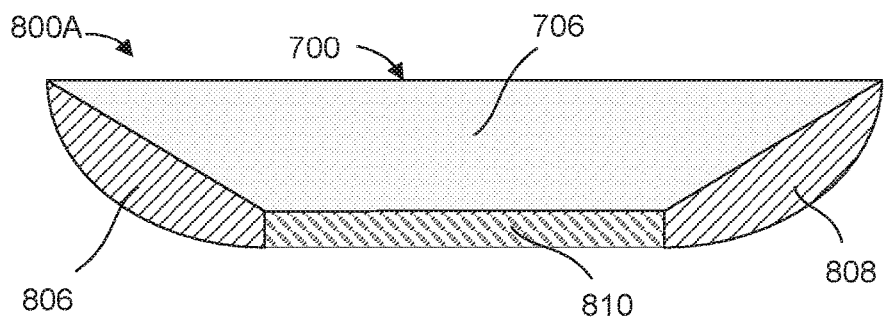
FIGS. 8E and 8F respectively illustrate front and side views of the exemplary sole of FIG. 8A having one or more sole components supported on the frame in accordance with an example of the present disclosure, the frame being shown without some of the sole components, however, to illustrate stabilizers of the frame.

FIG. 8E illustrates a front view of the sole 800A of FIG. 8A, and illustrating the front stabilizer 706 of the frame 700. For clarity, the front sole component 802 is omitted from the frame 700 in order to illustrate the underlying surface of the front stabilizer 706 that backs and supports the sole component 802. A rear view of the frame 700 showing the rear stabilizer 708 can be substantially the same as the front view of FIG. 8E. As illustrated, the front stabilizer 706 (as well as the rear stabilizer 708) can be configured as a flat-plate in a substantially trapezoidal shape.

Figure 8F:
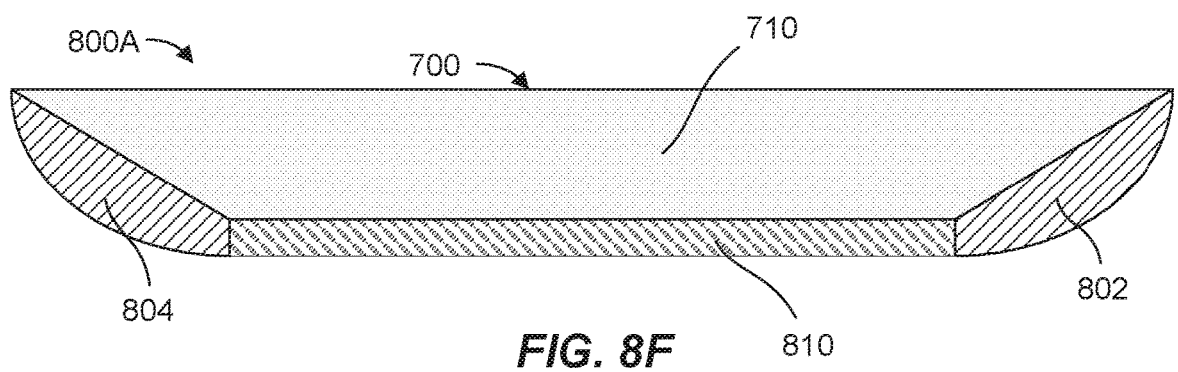

FIG. 8F illustrates a side view of the sole 800A of FIG. 8A, illustrating the first lateral stabilizer 710 of the frame 700. An opposite side view of the frame 700 showing the second lateral stabilizer 712 can be substantially the same as the front view of FIG. 8F. As illustrated, the first lateral stabilizer 710 (as well as second lateral stabilizer 712) can be configured as a flat-plate in a substantially trapezoidal shape. Although shown as a trapezoid, the stabilizers 706, 708, 710, and 712 can be of any shape and are not limited by this disclosure. Moreover, the frame 700 can be configured, such that the stabilizers 706, 708, 710, and 712 are not in contact with one another (i.e., they are separate structures extending from the base).

Figure 8G:
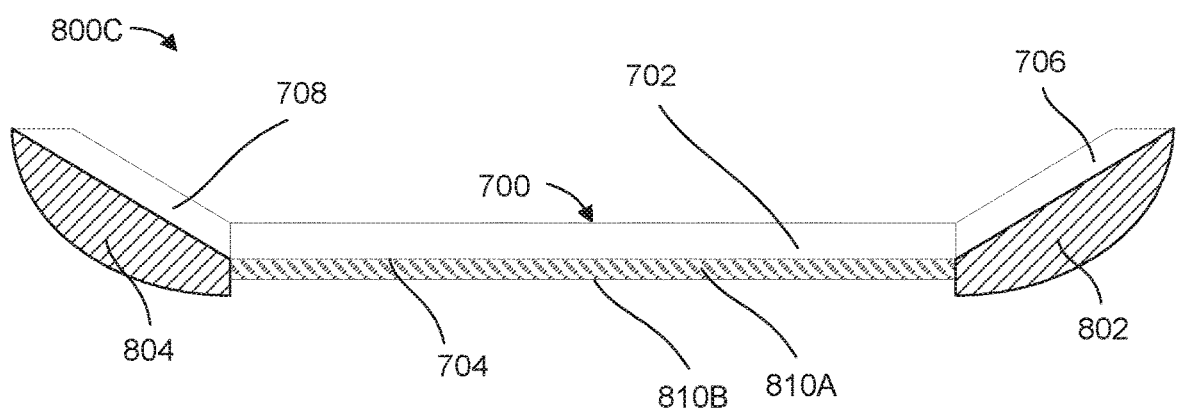
FIG. 8G illustrates a side view of the exemplary sole of FIG. 8A showing different thicknesses of sole components supported on the frame.

FIG. 8G illustrates a side view of another variation of the sole 800C of FIG. 8A, the frame 700 showing the front stabilizer 706, the rear stabilizer 708, and the first lateral stabilizer 710 according to another example configuration. In this example frame 700, the sole component 810A supported about the lower surface 704 of the base 702 comprises a thickness that is less than a thickness of the sole components 802 and 804 supported about the front and rear stabilizers 706 and 708, respectively. In other words, the sole components 802 and 804 can sit proud of the sole component 810A with respect to the frame 700. In other words, the sole components 802 and 804 can project or extend out further than a ground contacting surface 8108 of the sole component 810A as shown in FIG. 8G. In an exemplary configuration, the sole component 810A can have a higher stiffness and lower compliance than the sole components 802 and 804. The sole components 802 and 804 can have a same or different compliance as each other and can either sit equally proud of the sole component 810A or can each be proud of the sole component 810A by a different amount.

With higher compliance sole components (e.g., sole components 802 and 804) sitting proud of the lower compliance sole component (e.g., sole component 810A), the more complaint sole components can support more load when standing flat when compared to a situation where the sole components 802 and 804 are not proud of the sole component 810A. This allows the load of the robot to be more evenly distributed over the sole despite sole components 802 and 804 being more compliant than sole component 810A. This configuration also allows the compliant sole components 802 and 804 to be able to behave with flexibility and compliance to lessen impacts and impulses on the robot during operation when they are separately loaded from each other, such as during heel-strike or toe-off events of a gait cycle.

Figure 8H:
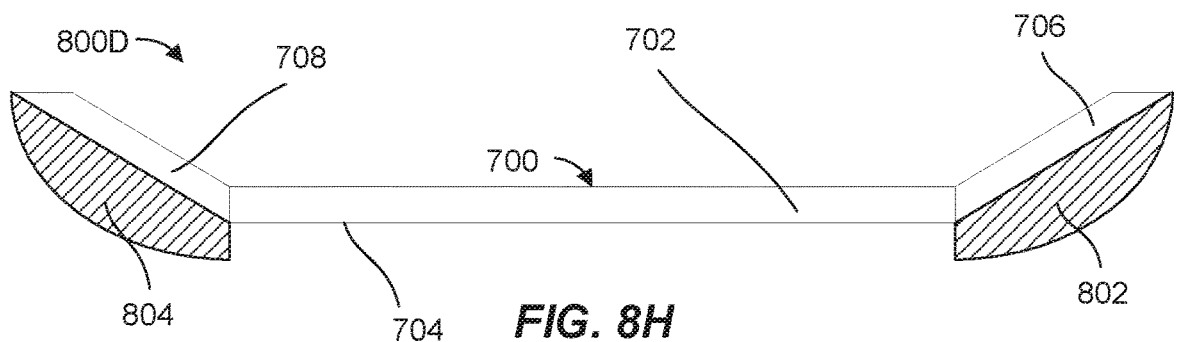
FIG. 8H illustrates a cross-sectional view of the exemplary frame of FIGS. 7A and 7B that receives and supports sole components to form a sole operable with a robot in accordance with an example of the present disclosure.

FIG. 8H illustrates a cross-sectional configuration of a sole 800D that is similar to the sole 800C of FIG. 8G, except that the sole 800D does not comprise the sole component 810A shown in FIG. 8G. In this configuration, the sole components 802 and 804, instead of sitting proud of the sole component 810A on the frame 700 as in the sole 800C of FIG. 8G, sit proud of the lower surface 704 of the frame. This configuration has the same effects as the example of FIG. 8G but omits the use of one sole component, namely the sole component 810A.

Figure 8I:
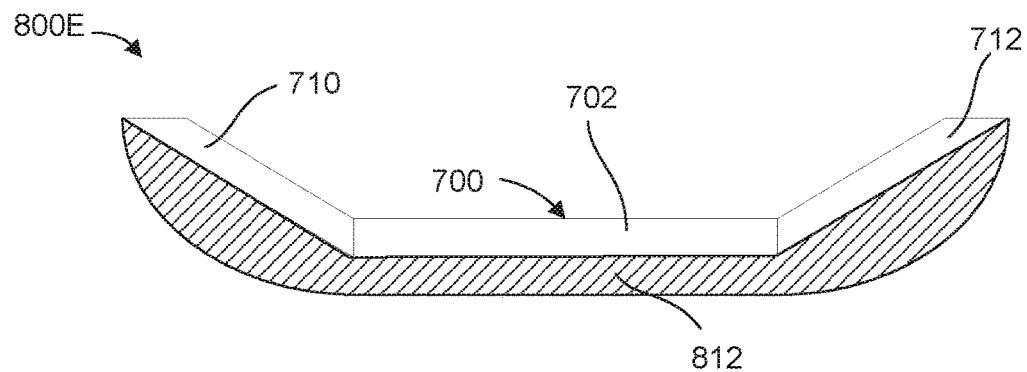
FIG. 8I illustrates a cross-sectional view of the exemplary frame of FIGS. 7A and 7B that receives and supports one or a single sole component to form a sole operable with a robot in accordance with an example of the present disclosure.
Figure 8J:
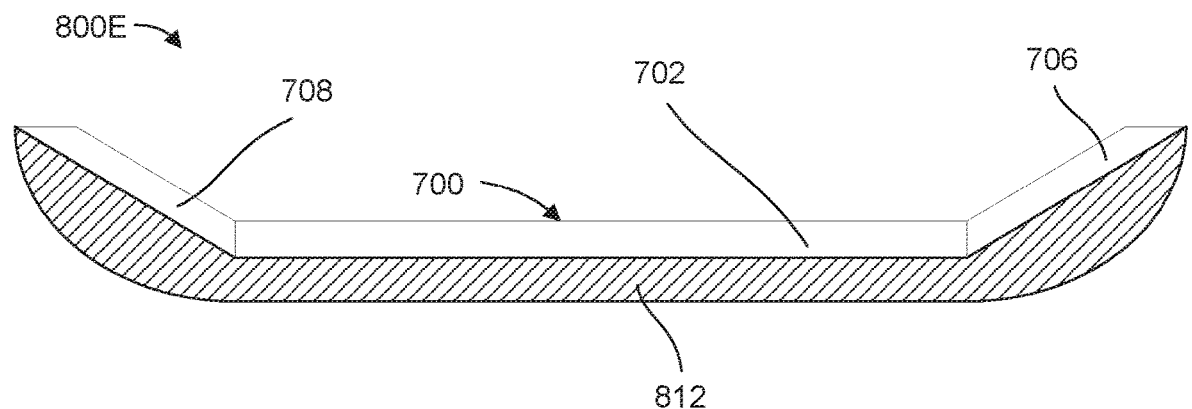
FIG. 8J illustrates an alternate cross-sectional view of the exemplary sole of FIG. 8I.

FIG. 8I illustrates a cross-sectional view of a sole 800E where a cross-section of the frame 700 is taken along line AA of FIGS. 7A and 7B, with a single sole component 812 disposed and supported thereon to form a compliant sole 800E operable with a gait-based robot, such as the gait-based robot 100 of FIGS. 1A-1D. FIG. 8J illustrates a cross-sectional view of the sole of FIG. 8I, with the cross-section of the frame 700 taken along line BB of FIGS. 7A and 7B, and with the single sole component 812 disposed and supported thereon. As shown in FIGS. 8I and 8J, and as discussed with respect to FIGS. 5J and 5K, a sole can be manufactured having a single sole component disposed on the frame 700 instead of multiple sole components. The single sole component can be manufactured, processed, or produced to have different compliance zones. Indeed, the sole component can be engineered and made of a single material or multiple materials that is processed or produced to vary in compliance throughout the material(s). As shown in FIGS. 8I and 8J, the frame 700 can receive and support a single sole component 812. A portion of the single sole component 812 can be supported on or about the front stabilizer 706 of the frame 700. The frame 700 can further receive and support a portion of the single sole component 812 on or about the rear stabilizer 708. Frame 700 can further receive and support a portion of the single sole component 812 on or about the first lateral stabilizer 710, and can further receive and support a portion of the single sole component 812 on or about the second lateral stabilizer 712. Additionally, as shown in FIG. 8A, the lower surface 704 of the frame 700 can receive and support the single sole component 812 thereon, with the interface surface of the sole component 812 being received and attached to the lower surface 704 of the frame 700. As shown, each of the stabilizers can be supported by the base 702 and can be disposed at an angle with respect to the base 702.

Figure 9A:
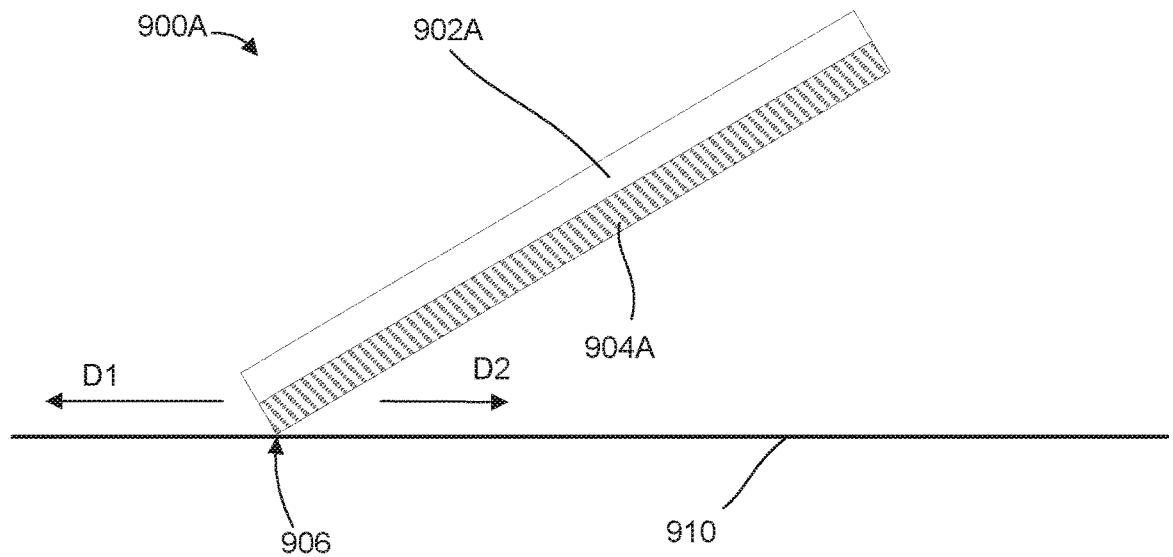
FIG. 9A illustrates a heel strike/toe off event of an exemplary sole having a frame without slanted or inclined stabilizer surfaces in accordance with an example of the present disclosure.
Figure 9B:
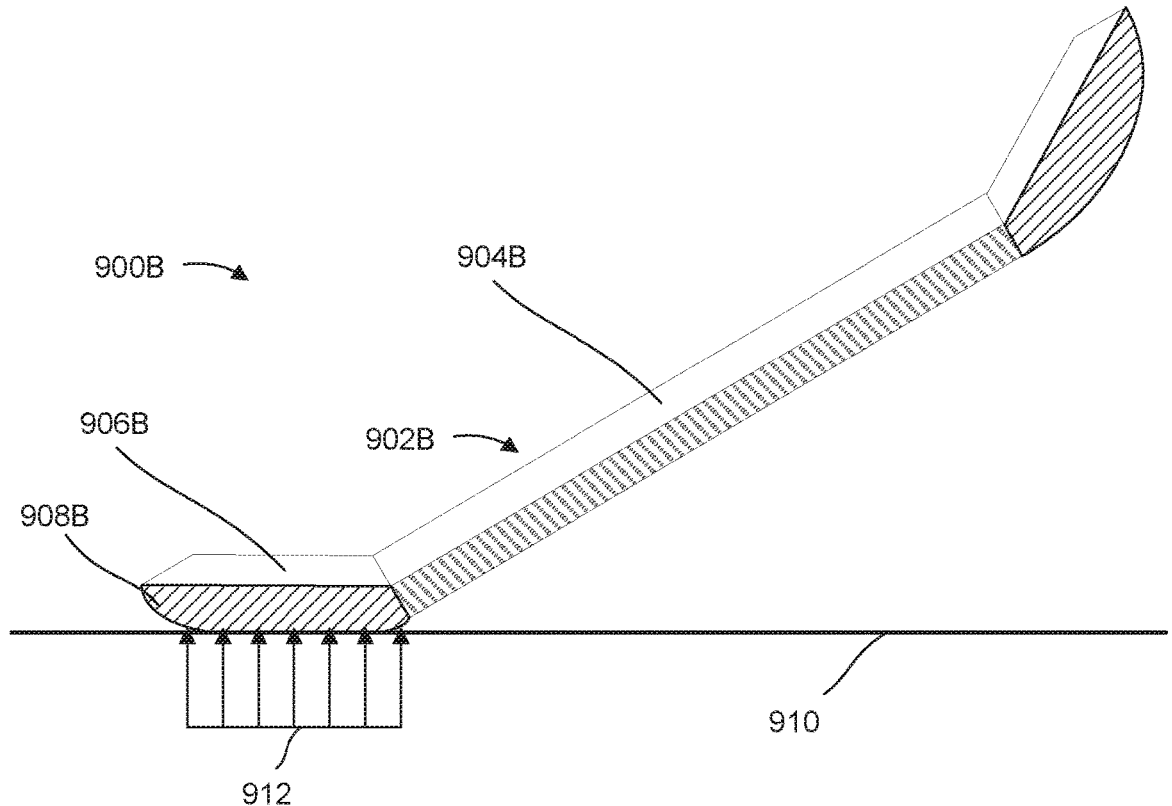
FIG. 9B illustrates a heel strike/toe off event of the exemplary sole of FIG. 8A, the frame having front and rear slanted stabilizers or backing surfaces.

The flat plate configuration of each sole component stabilizer aids and facilitates stabilization in both first and second lateral and front/backward directions during gait-based, gait-associated and/or stance-associated movements and/or operations of the gait-capable robot, as illustrated and explained with respect to FIGS. 9A and 9B. FIG. 9A illustrates a sole 900A impact with a ground surface with the sole 900A impacting the surface at any of the edges of the sole 900A, such as during a heel strike/toe off event during locomotion of the robot. It is to be understood that FIG. 9A is also indicative of a sole configuration during an edge-supported standing operation (e.g., toe-standing stance) of the robot.

As shown in FIG. 9A, the frame 902A does not include a stabilizer to support and stabilize sole component 904A. As a result, the sole 900A is in contact with the locomotion surface 910 at a single point of contact, or a line contact 906. Point contacts and line contacts in robots are known to be unstable. This is because all of the weight and force of the robot is distributed over and balanced on a very small surface area corresponding to the line of contact or point of contact. As shown in FIG. 9A, the line contact between the locomotion surface 910 lacks support and stabilization in at least a first direction D1 and a second direction D2. In this case the robot is unstable and prone to tipping in one of the unsupported directions, resulting in possible falling and damage to the robot (and injury to a user, such in the case of a wearable exoskeleton-type of robot). Accordingly, line and point contacts should be avoided.

FIG. 9B shows a configuration of the sole 900B (which in similar to the sole of FIG. 8A) where the frame 902B supports sole components thereon. The sole 900B is shown as being in the same orientation relative to the locomotion surface (ground) as the sole 900A of FIG. 9A (e.g., the sole 900B being shown in a position during a toe-off or heel strike event of a gait-cycle of the robot). The frame 902B can comprise a base 904B and a stabilizer 906B supported by the base 904B that is configured to support the sole component 908B. The stabilizer 906B is shown as being disposed at an angle with respect to the base 904B in order to facilitate stable stance positions, locomotion, and other movements and/or operations of the robot. As shown in FIG. 9B, the angle between the stabilizer 906B and the base 904B results in a contact between the sole 900B and the locomotion surface 910 in which the stabilizer 906B is substantially parallel to the locomotion surface 910. During contact between the sole 900B and the locomotion surface 910, the sole component 908B compresses between and conforms to the locomotion surface 910 as well as the stabilizer 906B. As a result, the force and weight of the robot are distributed over a larger surface area as compared to the force and weight of the robot being distributed about a line or point contact. In order to provide stability, balance, and to lessen impact forces on the sole and robot, forces of the impact should desirably be distributed over as broad an area as possible. This limits stress, impact, and other factors acting on the robot. As shown in FIG. 9B, the force 912 is distributed over the entire plate of the stabilizer 906B, as well as the sole component 908B. The stabilizer 906B therefore provides stabilization over a larger area including first and second lateral stabilization and front/back stabilization for the robot. Accordingly, the robot is better supported and stabilized during various gait-based, gait-associated and/or stance-associated movements and/or operations, such as locomotion, standing flat-footed, and standing in an edge-supported standing stance (e.g., toe-standing stance).

It is noted that the above description and illustration in FIG. 9B applies to any of the sole with stabilizer examples described herein, including example soles having any one or all of the rear, front, first lateral, and second lateral stabilizers 706, 708, 710, and 712 that are supported by the base 702 and formed at an angle with respect to the base 702. Indeed, each of the stabilizers 706, 708, 710, and 712, being flat plates, can function to add stabilization to the robot by distributing forces over a larger surface area than any ground contacting appendages only capable of line or point contact interfaces with the ground.

In the previous examples, the stabilizers have been described as part of a frame that is removably attached to the appendage of a robot. In another example, the stabilizers can be integrally formed with the frame, or they can be separate elements that can be attached to the frame. In another example, the frame may not be necessary. Instead, stabilizers having one or more stabilizing surfaces can be integrally formed with the appendage of the robot, such that sole components themselves are removably directly attached to the appendage of the robot so that individual sole components can be removed and replaced from the appendage as necessary. In such a configuration, the frame 700 shown in FIGS. 7A-7B can be a foot support of an appendage of the robot instead of a separate frame that is part of a sole operable with the appendage.

Figure 10A:
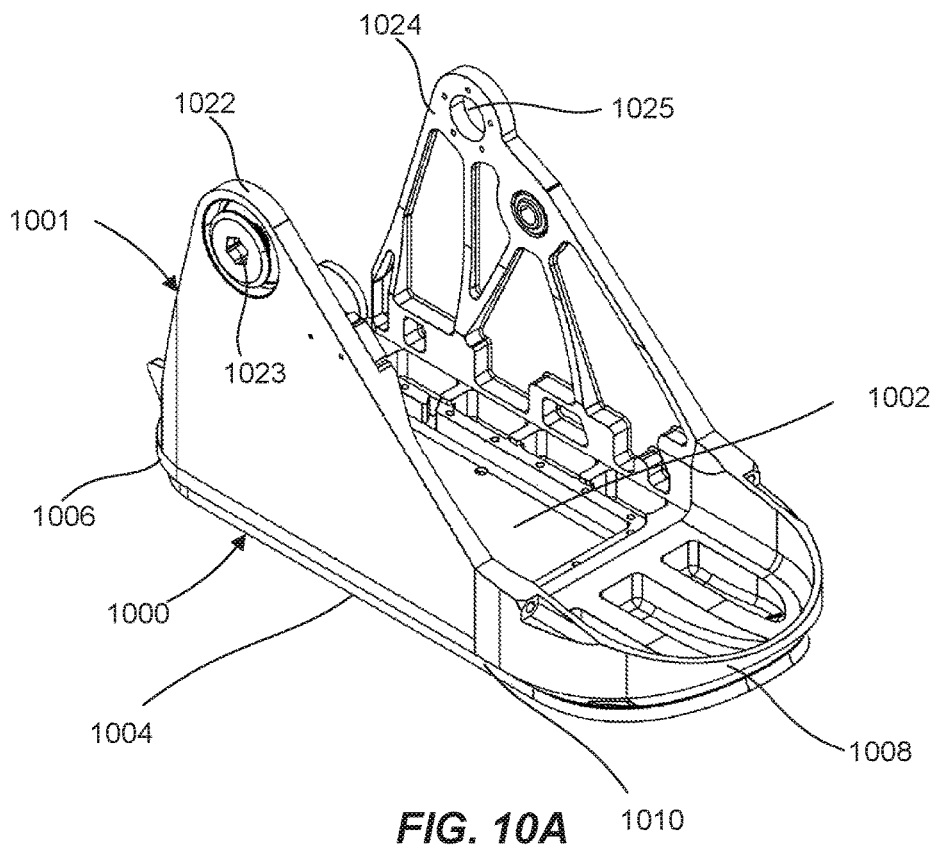
FIG. 10A illustrates an isometric view of an exemplary compliant sole supported on an appendage of a robot, such as the appendage of the robot of FIG. 1A, in accordance with an example of the present disclosure.

FIG. 10A illustrates an exemplary compliant sole 1000 supported on an appendage 1001 of a robot, such as the robot 100 of FIGS. 1A-1D, according to an example of the present disclosure. FIG. 10A is an isometric view of the sole 1000 and the appendage 1001, which appendage 1001 can correspond to appendages 102 and 104 illustrated in FIG. 1A as being part of the robot 100.

Figure 10B:
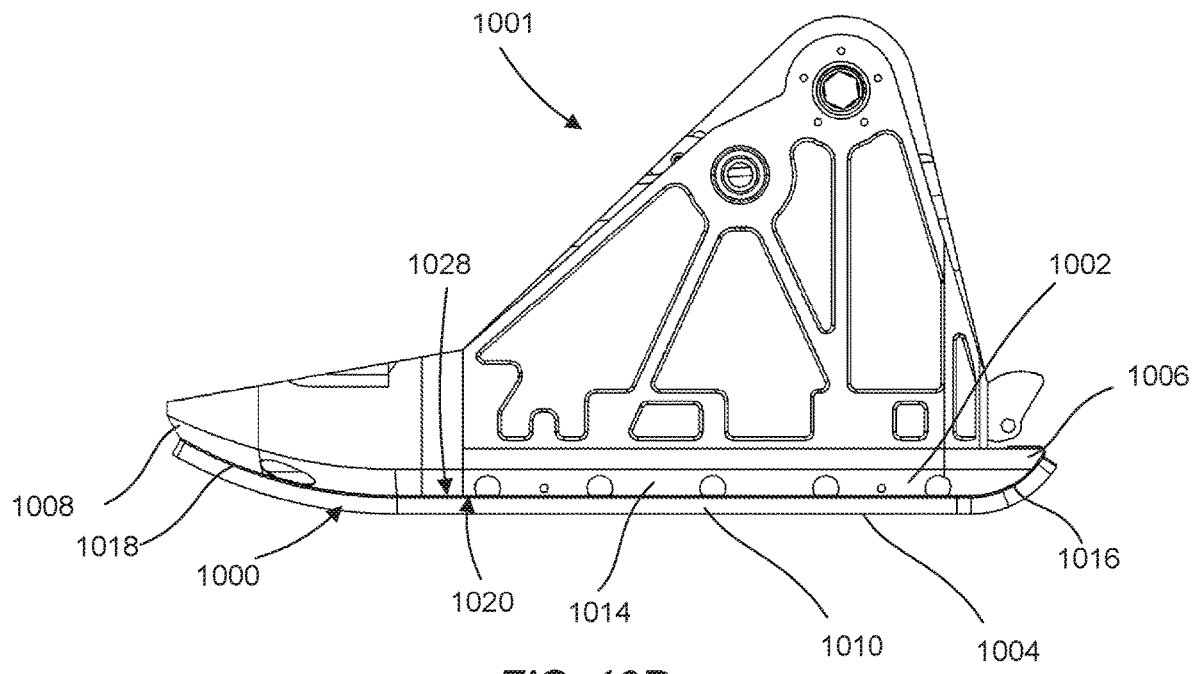
FIG. 10B illustrates a side view of the exemplary compliant sole of FIG. 10A.

It will be appreciated that any of the stabilizers illustrated in FIGS. 7A-8J can be incorporated into the sole 1000 of FIGS. 10A and 10B, and the sole 1000 can be modified to include configurations and elements of the soles of FIGS. 4-8J without departing from this disclosure. As illustrated, the appendage 1001 can comprise a base 1002 configured to receive and support a foot of a user (or a foot plate or boot binding (not shown)) of an exoskeleton type gait-capable robot (again, or any type of robot in addition to an exoskeleton). The base 1002 of the appendage 1001 can facilitate support and attachment of various robotic components (e.g., foot plate or boot binding) or human appendages within a boot or other protective device to the appendage 1001 using various attachment means, such as fasteners, screws, bolts, fastening systems (e.g., quick-release binding or other system), hook and loop fasteners, adhesives, magnets or any combination of these. For example, bolts may be inserted through the robotic component and into the base 1002 of the appendage 1001 to attach the component to the appendage 1001.

The appendage 1001 can include a heel end 1006, a toe end 1008 and a mid-portion 1014 disposed between the heel end 1006 and the toe end 1008. The appendage 1001 can further include one or more sidewalls 1022 and 1024 that project upward from the base 1002 of the appendage 1001 to facilitate attachment of the appendage 1001 to other parts or appendages of the robot. For example, each of the sidewalls 1022 and 1024 can include holes 1023 and 1025 that can receive an attachment mechanism, such as a fastener or bolt to attach the appendage 1001 in support of the sole 1000 to the leg or other appendage/structure of the robot (e.g., see robot 100 in FIG. 1).

The method of attachment of the walls 1022 and 1024 to structures of the robot is not intended to be limited in any way. Any known method or device of attachment can be used to attach walls 1022 and 1024 to the robot, including but not limited to screws, bolts, fasteners, welding, adhesives, springs, clips, magnets, hook and loop fasteners, or any other suitable form of attachment. Moreover, the specific configuration of the appendage 1001 is not intended to be limiting in any way as those skilled in the art will recognize that the appendage 1001 and the sole 1000 can comprise a number of configurations and components, surfaces, elements, etc. to facilitate interfacing of the appendage 1001 in support of the sole 1000 with the robot.

The sole 1000 can comprise a lower or ground contacting surface 1004 (e.g., provided and defined by the ground contacting surfaces of respective sole components attached to the appendage 1001) configured to contact a locomotion surface or ground during operation of the robot to which the sole 1000 is attached. The sole 1000 can include one or more sole components 1010 that provide compliance to the sole 1000 and the appendage 1001 to which the one or more sole components 1010 are attached.

FIG. 10B illustrates a side view of the appendage 1001. The sole 1000 supported on the appendage 1001 can further include one or more sole components 1010 defining the bottom or ground contacting surface 1004 of the sole 1000, where at least some of the sole components 1010 comprise one or more compliant materials. In one example, the one or more sole components 1010 can be configured to be discrete from each other and configured to comprise one or more compliant materials having the same or different degrees of compliance, as described elsewhere herein. In another example, the sole 1000 can comprise a single sole component that varies in compliance in different zones or regions of the sole component as described with reference to FIGS. 5J and 5K. In another example, the sole component 1010 can comprise a single piece of isotropic material.

The one or more sole components 1010 can be attached to the appendage 1001 that supports the one or more sole components 1010 thereon. As illustrated, the appendage 1001 can comprise a base 1002. In this example, the appendage 1001 can comprise various stabilizers rather than these being in the sole 1000. Indeed, the appendage 1001 can comprise a rear stabilizer 1016 supported by the base 1002 at the heel end 1006 of the appendage 1001 and a front stabilizer 1018 supported by the base 1002 at the toe end 1008 of the appendage 1001. It will be appreciated that any of the stabilizers illustrated in FIGS. 7A-8J can be incorporated into the appendage 1001 of FIGS. 10A and 10B. Stabilizers need not be flat plates disposed at single angles with respect to the base of the appendage (such as is shown in the frames and stabilizers of FIGS. 7A through 8J). For example, front stabilizer 1018 can be formed to have a curved surface to better cushion forces in the robot, such as during a toe-off event during locomotion and to provide a smooth transition of the sole 1000 from ground-contacting events to events where the sole 1000 is separated from or out of contact with the ground. Similarly, rear stabilizer 1016 may also comprise a curved surface instead of a flat surface to better cushion impulses, such as during a heel strike event and to gradually transition the sole 1000, such as from the heel-strike to a flat footed stance during locomotion of the gait-capable robot. Any of the configurations of frames and stabilizers (e.g., FIGS. 7A-10B) described herein can be either a flat plate disposed at a fixed angle or can be a rounded or curved surface to facilitate locomotion. The configurations of frames and stabilizers described herein are not intended to be limited in any way.

The one or more sole components 1010, as describe herein, can be made of at least one compliant material to provide compliance to the sole 1000. The sole 1000 and the one or more sole components 1010 included on the sole 1000 can be modified to include configurations and elements of sole components as is shown in any of the soles described and shown with respect to FIGS. 4-8J without departing from this disclosure. As shown in FIG. 10B, the one or more sole components 1010 can provide and define a lower surface 1004 (e.g., ground contacting surface) and an interface surface 1020. The ground-contacting or lower surface 1004 can be operable to function as the lowermost interface between the robot 100 and a ground or other surface upon or about which the robot 100 is operated. In other words, the one or more sole components 1010 of compliant sole 1000 can each comprise and define a ground contacting surface 1004 intended to be in physical contact with the ground or other surface upon or about which the robot 100 is operated.

The interface surface 1020 (e.g., the upper surfaces or non-ground contacting surfaces of the one or more sole components 1010) can be considered a robot interface, and can be configured to interface with the appendage 1001. The appendage 1001 can include an interface surface 1028 on the lower side of the appendage 1001. The interface surface 1020 of the one or more sole components 1010 can interface with the interface surface 1028 (e.g., the lower surface) of the appendage 1001. The one or more sole components 1010 can be secured to the interface surface 1028 of the appendage 1001 via one or more fasteners, screws, bolts, spring clips, magnets, adhesives, threaded rods, hook and loop fasteners, any combination thereof, or any other known method or device of attachment. The one or more sole components 1010 can have a configuration as in any examples of the soles and/or sole components described in this disclosure. Additionally, any number of sole components of any shape or configuration can be attached to the appendage 1001 as the sole 1000 as in any of the examples described in this disclosure, such as, for example, any of FIGS. 5A through 6C and the accompanying disclosure.

Figure 10C:
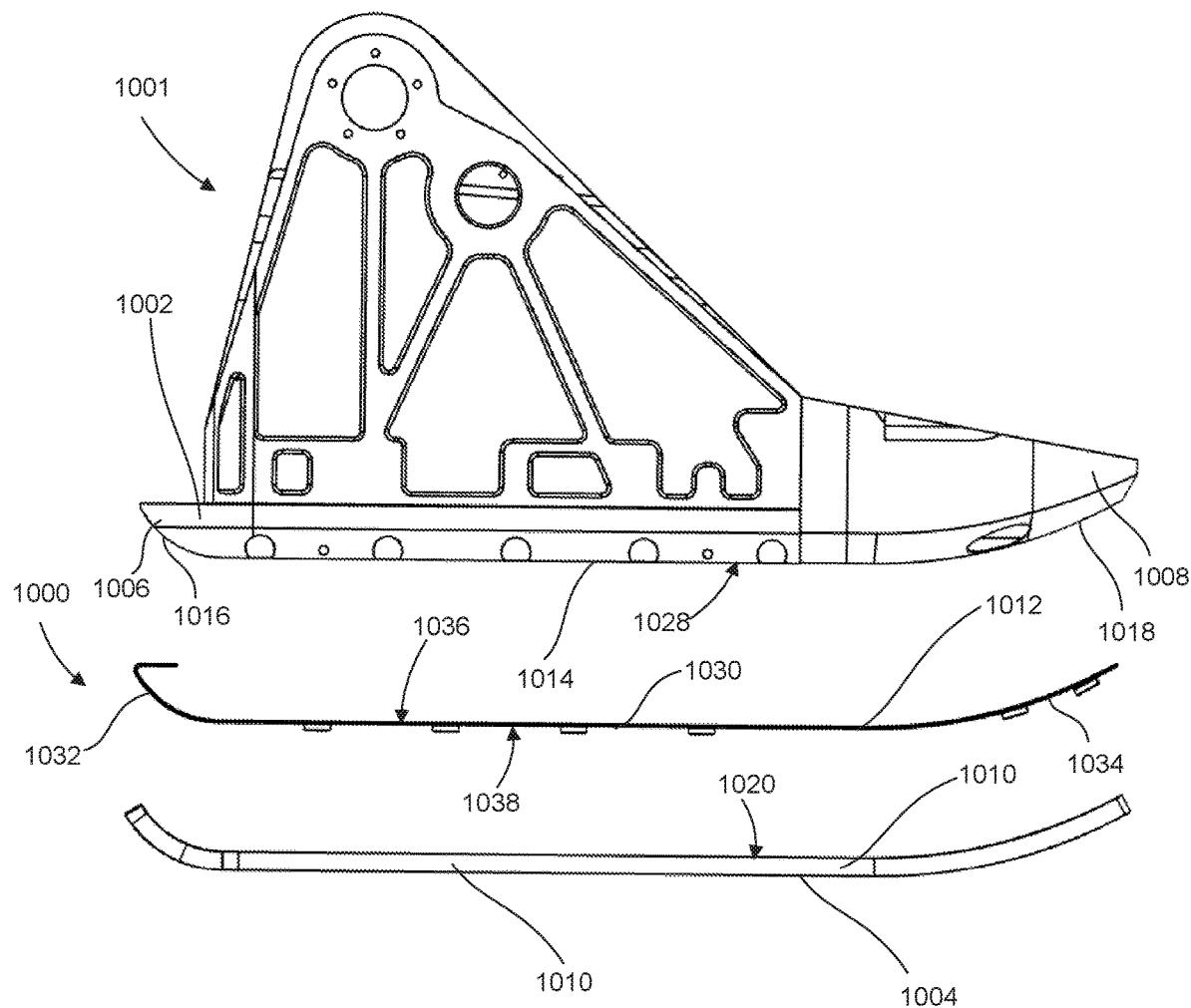
FIG. 10C illustrates a side exploded view of an exemplary appendage of a robot, such as the appendage of the robot of FIG. 1A, being attached to an exemplary compliant sole.

The sole 1000 can be integrally formed with the appendage 1001 or can be removably coupled to the appendage 1001. FIG. 10C illustrates an exploded side view of an exemplary appendage 1001 and sole 1000 of a robot where the sole 1000 is removable from the appendage 1001 and further comprises a frame 1012. The shape and configuration of an appendage of a robot is not intended to be limited by the disclosure in any way. Shapes and configurations other than the shape and configuration shown as the appendage 1000 in FIG. 10C are within the scope of this disclosure. More configurations including different shapes, materials, components, and functions are possible. Furthermore, the shape and configuration of the compliant sole 1000 is not intended to be limited by the disclosure in any way.

The appendage 1001 can be attached to the compliant sole 1000 via a plurality of fasteners, such as screws, bolts, spring clips, magnets, adhesives, threaded rods, hook and loop fasteners, spring clips, or others which can be inserted through and attached to the sole 1000 through holes formed in the appendage 1001 or can be disposed on an interface surface of the appendage 1001. The method of attachment is not intended to be limited in any way by this disclosure. Furthermore, one or more side walls 1022 and 1024 can alternately or additionally facilitate attachment of the appendage 1001 to another structure or appendage of the robot.

As illustrated, the sole 1001 can comprise one or more compliant sole components 1010 (which can be similar to and be of any configuration having any aspects of sole components described in the present disclosure). The sole 1001 can further comprise a frame 1012 that is configured to support the sole components 1010 thereon and is operable to be connected to the appendage 1001. The frame 1012 can comprise a base 1030. The frame 1012 can further comprise one or more stabilizers, as taught herein. As shown in this example, the frame 1012 can comprise a rear stabilizer 1032 supported by the base 1030 at a heel end of the frame 1012 and a front stabilizer 1034 supported by the base 1030 at a toe end of the frame 1012. It will be appreciated that any of the stabilizers illustrated in FIGS. 7A-8J (or others as will be recognized by those skilled in the art) can be incorporated into the frame 1012 of FIG. 10C. As shown in FIG. 10C, stabilizers 1034 and 1032 of the frame 1012 correspond to stabilizers 1018 and 1016 of the appendage 1001. However, it is to be understood that the stabilizers of the frame 1012 need not correspond exactly to the stabilizers or surfaces of the appendage 1001, or that the appendage 1001 be required to comprise any stabilizers as these may be provided solely by the frame 1012 in some examples. The frame 1012 can comprise more stabilizers (such as any of those that are shown with respect to FIGS. 7A-8J herein) than are formed on the appendage 1001. Furthermore, the frame 1012 can comprise a flat plate having compliant material thereon, such that no stabilizers are formed on the frame 1012 and the frame forms one flat plane.

As further shown, the stabilizers may or may not be flat plates disposed at single angles with respect to the base 1030 of the frame 1012 (such as is shown in the frames and stabilizers of FIGS. 7A through 8J). For example, front stabilizer 1034 can be formed to have a curved surface to better cushion forces in the robot, such as during a toe-off event during locomotion and to provide a smooth transition of the sole 1000 from ground-contacting events to events where the sole 1000 is separated from or out of contact with the ground. Similarly, rear stabilizer 1032 may also comprise a curved surface instead of a flat surface to better cushion impulses, such as during a heel strike event and to gradually transition the sole 1000, such as from the heel-strike to a flat footed stance during locomotion of the robot.

Any of the configurations of frames and stabilizers (e.g., FIGS. 7A-10B) described herein can be either a flat plate disposed at a fixed angle or can be a rounded or curved surface to facilitate locomotion. The configurations of frames and stabilizers described herein are not intended to be limited in any way.

The frame 1012 can further include a robot interface, such as an upper interface surface 1036 that can interface with the appendage 1001 at interface surface 1028. The frame 1012 can further include an interface surface 1038 on the lower side of the frame 1012. The interface surface 1020 of the one or more sole components 1010 can interface with the interface surface 1038 (e.g., the lower surface) of the frame 1012. The one or more sole components 1010 can be secured to the interface surface 1038 of the frame 1012 via one or more fasteners, screws, bolts, spring clips, magnets, adhesives, threaded rods, hook and loop fasteners, any combination thereof, or any other known method or device of attachment. The one or more sole components 1010 attached to the frame 1012 can have a configuration as in any examples of the soles and/or sole components described in this disclosure for example, any of FIGS. 5A through 6C and the accompanying disclosure. Additionally, any number of sole components of any shape or configuration can be attached to the frame 1012 as in any of the examples described in this disclosure, such as, for example, any of FIGS. 5A through 6C and the accompanying disclosure. The frame 1012 can be similar to and be of any configuration having any aspects of frames described in the present disclosure such as in FIGS. 7A-9B.

The one or more sole components 1010 and the frame 1012 together can comprise the sole 1000. The frame 1012 in the example of FIG. 10C can comprise the robot interface being configured to interface with an appendage 1001 of a robot to facilitate attachment of the sole 1000 to the robot 100. As described above, the frame 1012, functioning as the robot interface can comprise one or more portions or structural elements or surfaces (e.g., upper interface surface 1036) configured to facilitate attachment of the sole 1000 to the appendage 1001 of the robot 100. The frame 1012 can further comprise a sole component surface (e.g., interface surface 1038) configured to receive and support the one or more sole components 1010 of the sole 1000. The robot interface (e.g., the frame 1012) can facilitate attachment to the appendage using various attachment means, such as fasteners, fastening systems (e.g., quick-release system), hook and loop fasteners, adhesives, or a combination of these.

Figure 10D:
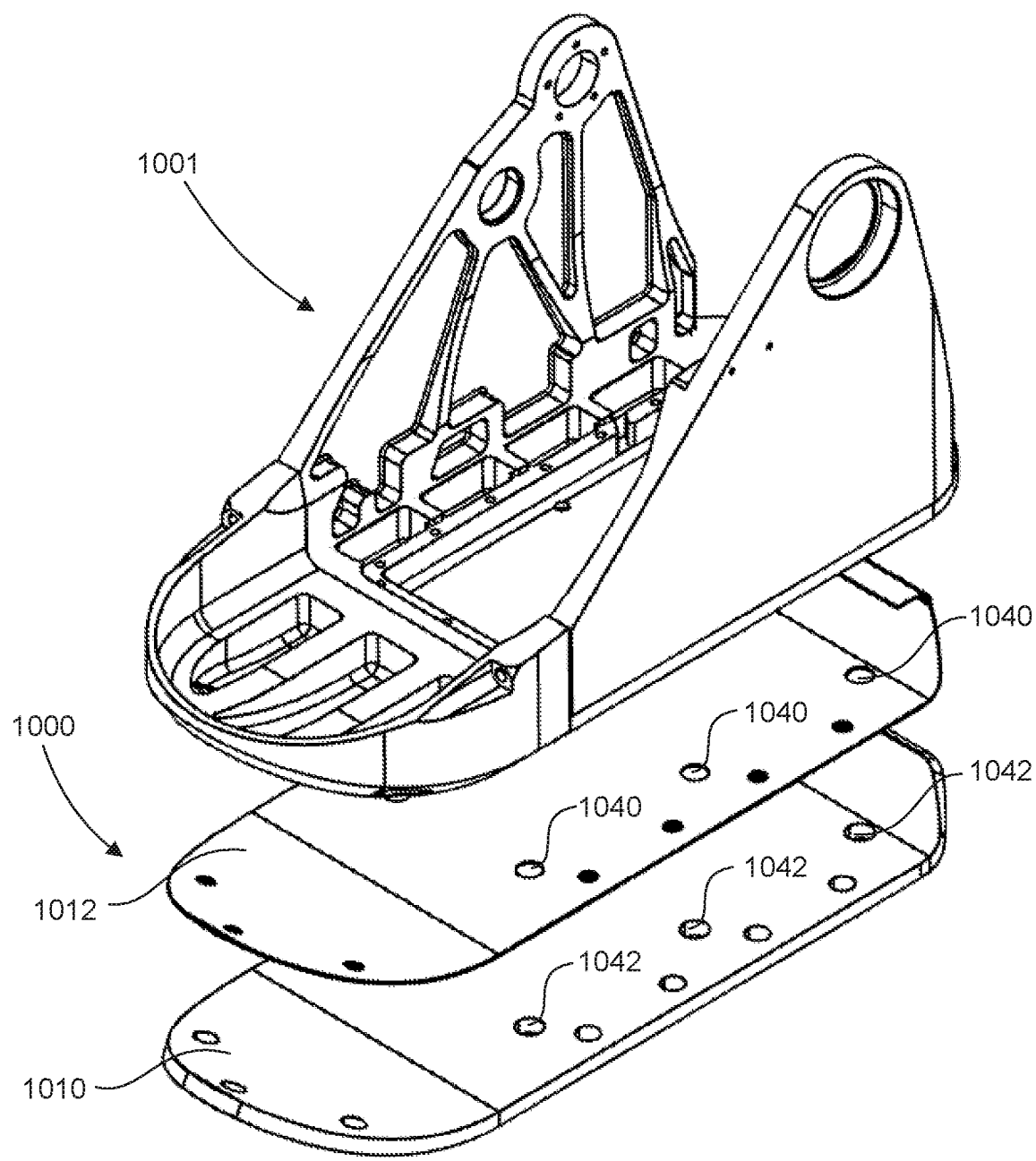
FIG. 10D illustrates an isometric exploded view of an exemplary appendage of a robot, such as the appendage of the robot of FIG. 1A, having an exemplary compliant sole.

FIG. 10D illustrates an exploded isometric view of the appendage 1001 and the sole 1000. As illustrated in FIG. 10D, each of the frame 1012 and the one or more sole components 1010 can comprise one or more holes 1040 or 1042 formed therein to facilitate attachment of the sole 1000 with the appendage 1001 by fasteners being driven through holes 1040 and 1042 and into corresponding holes formed in the bottom of appendage 1001. Again, it is to be understood that the methods of attaching the frame 1012 to the appendage 1001, the one or more sole components 1010 to the frame 1012, and/or the one or more sole components 1010 to the appendage 1001 are not intended to be limited in any way by this disclosure.

Figure 11A:
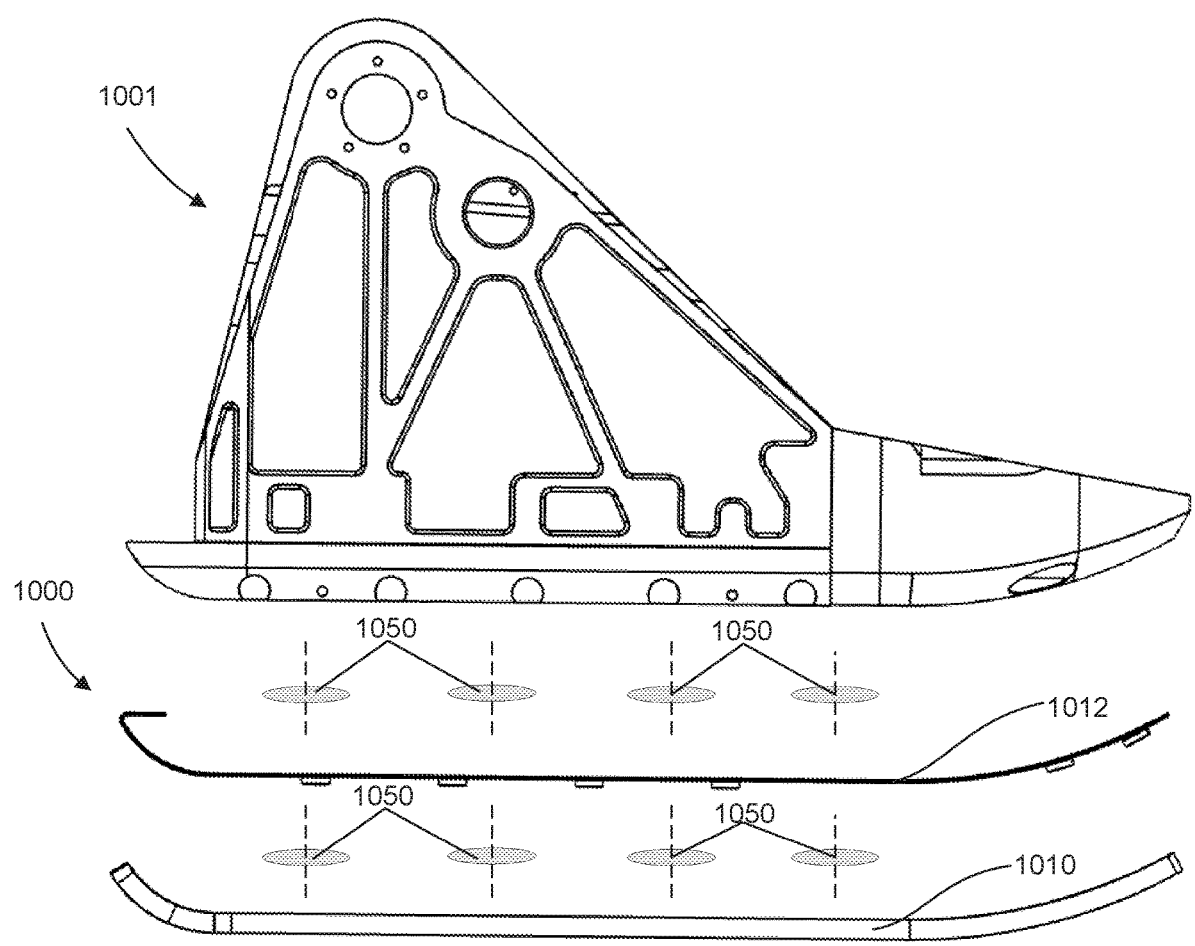
FIG. 11A illustrates an exploded side view of an exemplary appendage of a robot, such as the appendage of the robot of FIG. 1A, being attached to an exemplary compliant sole.

FIG. 11A illustrates an exploded side view of an exemplary configuration for attaching the sole component(s) 1010 to the appendage 1001 of the robot. In the configuration shown, one or more force sensors 1050 can be disposed between the appendage 1001 and the sole 1000 in order to register forces from sole impacts with a ground surface and to provide force data to the robot. The force sensors 1050 can be disposed between the appendage 1001 and the frame 1012 of the sole 1000. Additionally or alternatively, the force sensors 1050 can be disposed between the frame 1012 of the sole 1000 and the sole component(s) 1010 of the sole 1000. The force sensors 1050 can also be disposed between both the appendage 1001 and the frame 1012 of the sole 1000 and the frame 1012 of the sole 1000 and the sole component(s) 1010 of the sole 1000. The sole 1000 can be attached to the appendage 1001 of the robot via a fastener, screw, bolt, spring clip, magnet, adhesive, threaded rod, hook and loop fasteners, or any other known method of attachment.

Figure 11B:
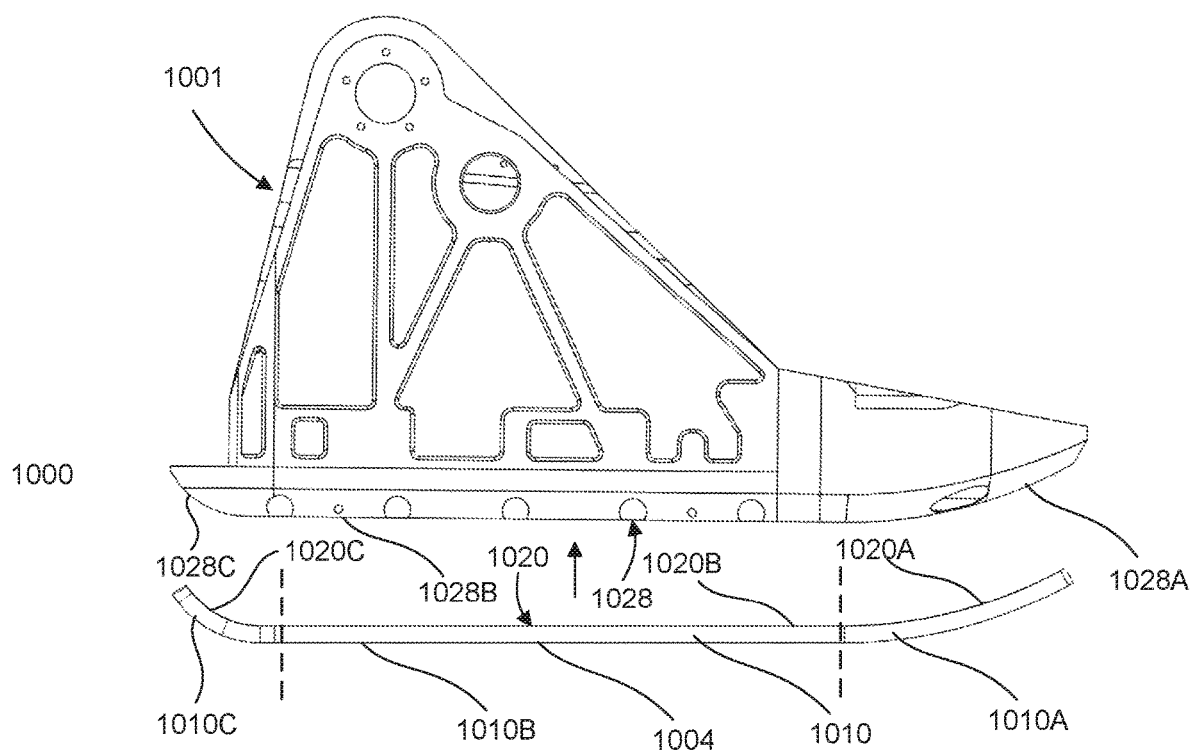
FIG. 11B illustrates an exploded side view of an exemplary appendage and sole including one or more sole components directly attached to the appendage of the robot of FIGS. 1A-1D.

FIG. 11B illustrates an exploded side view of an exemplary alternative configuration for attaching the sole component(s) 1010 directly to the appendage 1001 of the robot as the sole 1000. As shown in FIG. 11B, the frame 1012 can be omitted and the sole components 1010 can be attached directly to the appendage 1001. The sole 1000 can comprise only one sole component 1010 The sole component 1010 can include an interface surface 1020 (e.g., the upper surface or non-ground contacting surface of the sole component 1010) that functions as a robot interface of the sole 1000. The interface surface(s) 1020 can include a front portion 1020A, a mid portion 1020B, and a rear portion 1020C. The sole component 1010 can further include and define a ground-contacting surface 1004 (including front portion 1004A, mid portion 1004B, and rear portion 1004C) intended to be in physical contact with the ground or other surface upon which the robot it operated during locomotion.

The interface surface(s) 1020A, 1020B, and 1020C can interface with interface surface(s) 1028A, 1028B, and 1028C (e.g., the lower surface) of the appendage 1001 corresponding to front, mid, and rear portions of the interface surface 1028. In this case, the interfaces surfaces 1028A, 1028B, and 1028C of the appendage 1001 can function as the front, mid, and rear stabilizers for supporting the sole components 1010. As shown, the sole 1000 (e.g., sole component 1010 can be attached directly to the appendage 1001 of the robot by interfacing the interface surface 1020 of the sole component 1010 with the interface surface 1028 of the appendage 1001.

The sole 1000/sole component 1010 can have a configuration as in any examples of the sole components described herein. Specifically, the sole 1000 can have a configuration as shown in FIGS. 5J and 5K where a single sole component has multiple different compliance zones. The sole component 1010 can have any configuration in accordance with any part this disclosure or the accompanying figures. The sole 1000/sole component 1010 can be secured to the appendage 1001 via one or more fasteners, screws, bolts, spring clips, magnets, adhesives, threaded rods, hook and loop fasteners, any combination thereof, or any other known method or device of attachment.

The sole component(s) 1010 can further comprise multiple sole components 1010A, 1010B, and 1010C that can be separate and discrete sole components that can be separately attached to the appendage 1001. As shown in FIG. 11B, the dashed lines can represent breaks in the sole components 1010A, 1010B, and 1010C. The sole component(s) 1010A, 1010B, and 1010C can include interface surface(s) 1020A, 1020B, and 1020C (e.g., the upper surfaces or non-ground contacting surfaces of the sole component(s) 1010) that function as robot interfaces of the sole 1000. The sole component(s) 1010A, 1010B, and 1010C can further include and define a ground-contacting surface 1004 intended to be in physical contact with the ground or other surface upon which the robot is operated during locomotion. The sole component(s) 1010 can comprise a plurality of sole components (such as in FIGS. 5A-5I, 6A-6C, and 8A-8H, for example).

The interface surfaces 1020A, 1020B, and 1020C of the sole components 1010A, 1010B, and 1010C can interface directly with interface surfaces 1028A, 1028B, and 1028C (e.g., the lower surface) of the appendage 1001. The interface surfaces 1028A, 1028B, and 1028C can be lower surfaces of different portions of the appendage 1001 such as a frontward portion, a middle portion, and a rearward portion of the appendage 1001. As shown, the sole 1000/sole components 1010A, 1010B, and 1010C can be attached directly to the appendage 1001 of the robot by interfacing the interface surfaces 1020A, 1020B, and 1020C of the sole component(s) 1010A, 10108, and 1010C with the interface surfaces 1028A, 10288, and 1028C of the appendage 1001. In other words, the frame 1012 can be omitted from the sole 1000 such that the multiple sole components 1010A, 10108, and 1010C directly interface with the appendage 1001. The sole component(s) 1010A, 10108, and 1010C can have a configuration as in any examples of the sole components described herein. Additionally, any number of sole components of any shape or configuration can be attached directly to the appendage 1000 similar to any of the examples described in this disclosure, such as, for example, any of FIGS. 5A through 6C and the accompanying disclosure. The sole components of any number, shape, and configuration can be secured to the appendage 1000 via one or more fasteners, screws, bolts, spring clips, magnets, adhesives, threaded rods, hook and loop fasteners, any combination thereof, or any other known method or device of attachment.

An exemplary method for facilitating stable operation of a gait-capable robot, such as during gait-based, gait-associated or stance-associated movements of operations of the robot (e.g., locomotion or standing, and others) is described with reference to FIG. 12. As shown in FIG. 12, method 1200 can comprise a step 1202 of configuring a sole to comprise a first sole component having a ground-contacting surface to be supported on an appendage of the robot at a first zone. The first sole component can be configured to support a hind foot region of the ground-contacting appendage of the robot to facilitate, for example, a stable sole-strike event during locomotion of the robot, as well as other movements and/or operations of the robot. The first sole component can be disposed on the sole to support a toe and/or heel region of the appendage of the robot.

A stable sole-strike event in step 1202 can comprise a heel-strike in which a heel of the sole contacts a locomotion surface during locomotion of the robot. The strike event can further comprise a toe-strike event in which the toe of the sole impacts the locomotion surface during locomotion. The compliant material of the first sole component facilitates the sole-strike event being stable by mitigating and/or absorbing impacts and forces on the robot appendage to decrease disturbances to the robot during locomotion. Therefore, the first sole component acts as a mechanical filter that decreases disturbances and instability in the robotic system caused by high impacts on the robot during operation.

Method 1200 can further comprise a step 1204 of configuring the sole to comprise a second sole component having a ground-contacting surface to be supported on the appendage of the robot at a second zone. The second sole component can be configured to support a midfoot region of the robot to facilitate, for example, a stable flat-footed stance and other movements and/or operations of the robot. The second sole component can be disposed on the sole to support a substantially central region of the appendage of the robot on which the robot rests in a still-standing position.

A stable flat-footed stance in step 1204 can comprise a stance the robot assumes when not in locomotion, or in other words, when the robot is standing still. The material of the second sole component can be compliant, yet rigid enough to support the weight of the robot when standing still. Therefore, the second sole component can act as a flat surface to stabilize the robot when the robot is standing still.

Method 1200 can further comprise a step 1206 of configuring a sole to comprise a third sole component having a ground-contacting surface to be supported on an appendage of the robot at a third zone, the third sole component being configured to support a forefoot region of the robot to facilitate, for example, a stable sole-off (i.e., toe-off) event during locomotion of the robot, as well as other movements and/or operations of the robot. The first sole component can be disposed on the sole to support a toe and/or heel region of the appendage of the robot.

A stable sole-off event in step 1206 can comprise a toe-off event in which the toe of the sole leaves the locomotion surface during locomotion. The compliant material of the third sole component facilitates the sole-off event being stable by mitigating and/or absorbing impacts and forces on the robot appendage during the event to decrease disturbances to the robot during locomotion. Therefore, the third sole component acts as a mechanical filter that decreases disturbances and instability in the robotic system caused by high impacts on the robot during locomotion.

Method 1200 can further comprise a step 1208 of configuring the sole to comprise a fourth sole component having a ground-contacting surface, to be supported on the appendage of the robot at a fourth zone, the fourth sole component being configured to support a first lateral area of the ground-contacting appendage of the robot.

Method 1200 can further comprise a step 1210 of configuring the sole to comprise a fifth sole component having a ground-contacting surface, to be supported on the appendage of the robot at a fifth zone, the fifth sole component being configured to support a second lateral area of the ground-contacting appendage of the robot.

Both the fourth sole component and the fifth sole components can support side edges of the appendage including the first lateral side and the second lateral side of the appendage. In these positions, the fourth and fifth sole components respectfully act to support first lateral and second lateral sides of the sole during stable standing of the robot, and further act to absorb impacts and forces on the sole and robot during first lateral and second lateral locomotion of the robot. The compliant material of the fourth and fifth sole components facilitate stable operation of the robot by mitigating and/or absorbing impacts and forces on the robot appendage to decrease disturbances to the robot during locomotion. Therefore, the fourth and fifth sole component act as a mechanical filter that decreases disturbances and instability in the robotic system caused by high impacts on the robot during locomotion.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein can be combined with other embodiments or features described herein, this disclosure should be read to describe any such combinations that would be practicable by one of ordinary skill in the art. The use of "or" in this disclosure should be understood to mean non-exclusive or, e.g., "and/or," unless otherwise indicated herein.

Furthermore, the described features, structures, or characteristics can be combined in any suitable manner in one or more examples. In the preceding description, numerous specific details were provided, such as examples of various configurations to provide a thorough understanding of examples of the described technology. It will be recognized, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A sole for a robot, comprising:
   a first sole component having a ground-contacting surface, the first sole component defining a first compliant zone; and
   a second sole component having a ground-contacting surface, the second sole component defining a second compliant zone, wherein the first sole component comprises a compliance different than a compliance of the second sole component; and
   a robot interface operable to facilitate attachment of the sole to a ground contacting appendage of the robot.

2. The sole of claim 1, wherein the first sole component is disposed at a rearward area of the sole so as to facilitate at least partial support of a hind foot of the ground-contacting appendage of the robot.

3. The sole of claim 1, wherein the second sole component is disposed adjacent the first sole component so as to facilitate at least partial support of at least one of a midfoot or a forefoot of the ground-contacting appendage of the robot.

4. The sole of claim 1, wherein the first sole component extends around an outer perimeter of the sole, wherein the first sole component circumscribes the second sole component.

5. The sole of claim 1, wherein the second sole component is disposed adjacent the first sole component at a first lateral side of the sole, the second sole component being operable to at least partially support one of a first lateral area or a second lateral area of the ground-contacting appendage of the robot.

6. The sole of claim 1, further comprising a third sole component having a ground-contacting surface, the third sole component defining a third compliant zone.

7. The sole of claim 1, wherein the sole is substantially in the shape of a human foot.

8. The sole of claim 1, wherein the compliance of the first sole component is greater than the compliance of the second sole component.

9. The sole of claim 8, wherein the first sole component sits proud of the second sole component with respect to a bottom of the sole.

10. The sole of claim 6, wherein the second sole component is disposed about a mid-area of the sole, and wherein the third sole component is disposed at a forward area of the sole so as to facilitate at least partial support of a forefoot of the ground-contacting appendage of the robot, the second sole component being situated between the first and third sole components.

11. The sole of claim 6, wherein the third sole component is disposed at a first lateral side of the sole so as to at least partially support one of a first lateral area or a second lateral area of the ground-contacting appendage of the robot.

12. The sole of claim 6, further comprising a fourth sole component having a ground-contacting surface, the fourth sole component defining a fourth compliant zone, wherein the fourth sole component is disposed at a first lateral side of the sole so as to support a first lateral area of the ground-contacting appendage of the robot.

13. The sole of claim 6, further comprising a fifth sole component having a ground-contacting surface, the fifth sole component defining a fifth compliant zone, wherein the fifth sole component is disposed at a second lateral side of the sole so as to support a second lateral area of the ground-contacting appendage of the robot.

14. The sole of claim 6, wherein a compliance of the third sole component is greater than the compliance of the second sole component.

15. The sole of claim 14, wherein the first sole component and the third sole component sit proud of the second sole component with respect to a bottom of the sole.

16. The sole of claim 12, wherein a compliance of the fourth sole component is greater than the compliance of the second sole component.

17. The sole of claim 13, wherein a compliance of the fifth sole component is greater than the compliance of the second sole component.

18. The sole of claim 13, wherein compliance of each of the first, third, fourth, and fifth sole components are the same.

19. The sole of claim 13, wherein the compliance of one or more of the first, third, fourth, and fifth sole components is different from the compliance of the other of the first, third, fourth, and fifth sole components.

20. The sole of claim 1, further comprising a structural frame in support of the first and second sole components, the structural frame comprising the robot interface operable to facilitate attachment of the sole to the ground contacting appendage of the robot.

21. The sole of claim 20, wherein the structural frame further comprises at least one sole component stabilizer configured to back one of the first or second sole components, and a base configured to support the at least one sole component stabilizer, the sole component stabilizer being formed on an angle with respect to the base.

22. The sole of claim 21, wherein the at least one sole component stabilizer comprises a curved stabilizer surface.

23. The sole of claim 21, wherein the structural frame further comprises a first sole component stabilizer configured to back the first sole component, a second sole component stabilizer configured to back the second sole component, and a base configured to support the first and second sole component stabilizers, the first and second sole component stabilizers being formed on an angle with respect to the base to facilitate stable stance positions of the robot.

24. The sole of claim 21, wherein the at least one sole component stabilizer comprises a plate-like configuration.

25. The sole of claim 1, wherein the robot interface comprises a surface of each of the first and second sole components, and wherein the surfaces of each of the first and second sole components are adhered to the ground-contacting appendage of the robot.

26. The sole of claim 1, wherein the robot interface comprises a surface of each of the first and second sole components, and wherein the surfaces of each of the first and second sole components are removably fastened to the ground-contacting appendage of the robot using one or more fasteners.

27. The sole of claim 1, further comprising at least one sensor.

28. The sole of claim 1, wherein one or more ground-contacting surfaces of the first and second sole components comprises a tread pattern formed thereon.

29. A sole for a robot, comprising:
- a sole component comprising a ground-contacting surface, and having at least a first compliant zone and a second compliant zone, wherein the first compliant zone comprises a compliance different than a compliance of the second compliant zone; and
- a robot interface operable to facilitate attachment of the sole to a ground-contacting appendage of the robot.

30. The sole of claim 29, further comprising a structural frame in support of the sole component, the structural frame comprising the robot interface.

31. The sole of claim 30, wherein the structural frame further comprises at least one sole component stabilizer configured to back the sole component, and a base configured to support the at least one sole component stabilizer, the sole component stabilizer extending away from the base.

32. The sole of claim 29, wherein the ground-contacting surface of the sole component comprises a tread pattern formed thereon.

33. A robot system, comprising:
- a robot comprising at least one ground-contacting appendage configured to facilitate locomotion of the robot; and
- a sole supported on the ground-contacting appendage, and operable to interface with a ground surface, the sole comprising:
  - a robot interface facilitating attachment of the sole to the robot;
  - a first sole component having a ground-contacting surface, the first sole component defining a first compliant zone; and
  - a second sole component having a ground-contacting surface, the second sole component defining a second compliant zone,
  - wherein the first sole component comprises a compliance different than the second sole component.

34. The robot system of claim 33, wherein the robot comprises at least one of a humanoid robot, a tele-operated robot, or a wearable exoskeleton.

35. The robot system of claim 33, wherein the sole further comprises a structural frame in support of the first and second sole components, the structural frame comprising the robot interface, and wherein the sole is removably coupled to the ground-contacting appendage of the robot via the robot interface.

36. The robot system of claim 33, wherein the robot interface comprises a surface of each of the first and second sole components, and wherein the surfaces of each of the first and second sole components are adhered to the ground-contacting appendage of the robot.

37. The robot system of claim 33, wherein the sole is integrally formed with the ground-contacting appendage of the robot.

38. The robot system of claim 33, wherein the robot is operable to achieve a heel-strike event of a gait cycle, the first sole component operating to absorb impact forces associated with the heel-strike event.

39. The robot system of claim 38, wherein the sole further comprises a structural frame in support of the first sole component, the structural frame comprising a sole component stabilizer configured to back one of the first or second sole components, and a base configured to support the at least one sole component stabilizer, the sole component stabilizer being formed on an angle with respect to the base to facilitate stable stance positions of the robot, wherein the sole component stabilizer provides lateral and front-back stabilization of the ground-contacting appendage and the robot during the heel-strike event.

40. The robot system of claim 39, wherein the sole component stabilizer comprises a curved stabilizer surface.

41. The robot system of claim 33, wherein the robot is operable to achieve a toe-off event of a gait cycle, the first sole component operating to absorb impact forces associated with the toe-off event.

42. The robot system of claim 41, wherein the sole further comprises a structural frame in support of the first or second sole components, the structural frame comprising a sole component stabilizer configured to back one of the first or second sole components, and a base configured to support the at least one sole component stabilizer, the sole component stabilizer being formed on an angle with respect to the base to facilitate stable stance positions of the robot, wherein the sole component stabilizer provides lateral and front-back stabilization of the ground-contacting appendage and the robot during the toe-off event.

43. The robot system of claim 33, wherein the robot is operable to achieve a toe stance event, the first sole component operating to support at least a portion of weight of the robot in the toe stance event, wherein the sole further comprises a structural frame in support of the first sole component, the structural frame comprising a sole component stabilizer configured to back one of the first or second sole components, and a base configured to support the at least one sole component stabilizer, the sole component stabilizer being formed on an angle with respect to the base to facilitate stable stance positions of the robot, wherein the sole component stabilizer provides a backing surface for the first sole component to conform to in order to distribute standing forces of the robot over an area corresponding to the sole component stabilizer and to provide lateral and front-back stabilization of the ground-contacting appendage and the robot during the toe stance event.

44. The robot system of claim 33, wherein the robot is operable to achieve a standing event, one of the first or second sole components operating to support at least a portion of weight of the robot in the standing event, wherein the sole further comprises a structural frame in support of the first or second sole components, the structural frame comprising a base, the base being operable to facilitate stable stance positions of the robot, wherein the base provides a backing surface for the first or second sole component to conform to in order to distribute standing forces of the robot over an area corresponding to the base and to provide stabilization of the ground-contacting appendage and the robot during the standing event.

45. The robot system of claim 33, further comprising at least one sensor supported between the sole and the ground-contacting appendage of the robot.

46. The robot system of claim 33, wherein one or more ground-contacting surfaces of the first and second sole components comprise a tread pattern formed thereon.

47. A method for facilitating stable operation of a robot, the method comprising:
configuring a sole to comprise a first sole component having a ground-contacting surface to be supported on a ground-contacting appendage of the robot at a first zone, the first sole component being configured to support a hind foot region of the ground-contacting appendage of the robot; and
configuring the sole to comprise a second sole component having a ground-contacting surface to be supported on the ground-contacting appendage of the robot at a second zone, the second sole component being configured to support a midfoot region of the robot,
wherein the first sole component comprises a compliance different than the second sole component.

48. A method of claim 44, further comprising:
configuring the sole to comprise a third sole component having a ground-contacting surface to be supported on the ground-contacting appendage of the robot at a third zone, the third sole component being configured to support a forefoot region of the robot.

49. A method of claim 45, further comprising:
configuring the sole to comprise a fourth sole component having a ground-contacting surface, to be supported on the ground-contacting appendage of the robot at a fourth zone, the fourth sole component being configured to support a first lateral area of the ground-contacting appendage of the robot.

50. A method of claim 46, further comprising:
configuring the sole to comprise a fifth sole component having a ground-contacting surface, to be supported on the ground-contacting appendage of the robot at a fifth zone, the fifth sole component being configured to support a second lateral area of the ground-contacting appendage of the robot.

51. The method of claim 47, further comprising:
configuring one or more ground-contacting surfaces of the first and second sole components to comprise a tread pattern formed thereon.

52. A robot system, comprising:
a robot comprising at least one ground-contacting appendage configured to facilitate locomotion of the robot; and
a sole supported on the ground-contacting appendage, and operable to interface with a ground surface, the sole comprising:
a sole component comprising a ground-contacting surface, and having at least a first compliant zone and a second compliant zone, wherein the first compliant zone comprises a compliance different than a compliance of the second compliant zone; and
a robot interface operable to facilitate attachment of the sole to a ground-contacting appendage of the robot.

53. The robot system of claim 52, wherein the ground-contacting surface of the sole component comprise a tread pattern formed thereon.

\* \* \* \* \*